United States Patent
Kubota et al.

(10) Patent No.: US 6,868,454 B1
(45) Date of Patent: Mar. 15, 2005

(54) DISTRIBUTED-OBJECT DEVELOPMENT SYSTEM AND COMPUTER-READABLE RECORDING MEDIUM RECORDED WITH PROGRAM FOR MAKING COMPUTER EXECUTE DISTRIBUTED-OBJECT DEVELOPMENT

(75) Inventors: Yasuo Kubota, Tokyo (JP); Nobuo Shiba, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/564,047

(22) Filed: May 3, 2000

(30) Foreign Application Priority Data

May 6, 1999 (JP) ............................................. 11-126471

(51) Int. Cl.[7] .............................................. G06F 15/16
(52) U.S. Cl. ....................... 709/237; 709/201; 709/203; 709/250
(58) Field of Search ................................ 709/201, 203, 709/237, 250, 220, 217, 219, 310, 330; 717/100, 106, 126; 703/21, 22

(56) References Cited

U.S. PATENT DOCUMENTS

| | | | | | |
|---|---|---|---|---|---|
| 5,872,958 | A | * | 2/1999 | Worthington et al. ......... | 703/13 |
| 5,881,269 | A | * | 3/1999 | Dobbelstein ................. | 703/21 |
| 5,892,917 | A | * | 4/1999 | Myerson ..................... | 709/224 |
| 6,042,614 | A | * | 3/2000 | Davidson et al. ............ | 717/116 |
| 6,105,059 | A | * | 8/2000 | Al-Karmi et al. ........... | 709/219 |
| 6,247,149 | B1 | * | 6/2001 | Falls et al. ................... | 714/45 |
| 6,314,531 | B1 | * | 11/2001 | Kram .......................... | 714/38 |
| 6,393,386 | B1 | * | 5/2002 | Zager et al. ................. | 703/25 |
| 6,442,141 | B1 | * | 8/2002 | Borella et al. .............. | 370/248 |
| 6,446,137 | B1 | * | 9/2002 | Vasudevan et al. ......... | 709/330 |
| 6,453,362 | B1 | * | 9/2002 | Bittinger et al. ............ | 709/316 |
| 6,457,066 | B1 | * | 9/2002 | Mein et al. ................. | 709/330 |
| 6,487,607 | B1 | * | 11/2002 | Wollrath et al. ............ | 709/330 |
| 6,493,768 | B1 | * | 12/2002 | Boutcher .................... | 709/330 |
| 6,598,090 | B2 | * | 7/2003 | Champlin ................... | 709/244 |
| 6,604,237 | B1 | * | 8/2003 | Giammaria ................. | 717/174 |

FOREIGN PATENT DOCUMENTS

JP 9-120366 A 5/1997

* cited by examiner

Primary Examiner—Glenton B. Burgess
Assistant Examiner—Anita Choudhary
(74) Attorney, Agent, or Firm—Staas & Halsey LLP

(57) ABSTRACT

A simulator machine obtains IDL information from an IDL definition storage, and automatically builds up a function of a server application or a client application based on the IDL information obtained. The simulator machine is connected to a WWW server that is one of nodes. Each of the rest of the nodes can access the WWW server by starting a WWW Browser thereby to build up on its own node a function of a server simulator or a client simulator that is provided by the simulator machine.

11 Claims, 28 Drawing Sheets

FIG.8

```
module    apts0001 {
  interface apts0001 {
    void op00 ( in long p1 , out long p2 ) ;
    ...
  };
  ...
};
```

FIG.12

```
         ****** REQUEST FILE start *******
1201 —    ****** /home/apts/dat/apts0001_sv.dat
1202 —    repid IDL:apts0001/apts0001:1.0
1203 —    interface apts0001::apts0001
1204 —    operation op00
1205 —    para p1 =2147483647
1206 —    invoke
1207 —    /home/apts/dat/apts0001_sv.dat
```

FIG.14

1401 — CREATE DATE : Mon Jan 1  13:44:54  1999

1402 — INVOKE FILE : /home/apts/dat/apts0001_sv.dat

1403 — SEQ  TIME  KIND  MESSAGE

1404 — 1  13:44:54.804  SERVER  * * * * *  SERVER TP INVOKE START * * * * *
1405 — 2  13:44:54.804  SERVER  REPID = IDL:apts0001/apts0001:1.0
1406 — 3  13:44:54.804  SERVER  OPERATION = op00
1407 — 4  13:44:54.811  SERVER  CORBA_NVList_add_item = p1
1408 — 5  13:44:54.811  SERVER  CORBA_NVList_add_item = p2
1409 — 6  13:44:54.819  SERVER  Nomal End
1410 — 7  13:44:54.819  SERVER  * * * * *  SERVER TP INVOKE END * * * * *

FIG.22

```
2201 — repId IDL:apts0001/apts0001:1.0
2202 — interface apts0001::apts0001
2203 — opreration op00
2204 — para p2 = -1
2205 — invoke
```

FIG.24

CREATE DATE : Mon Jan 1 13:44:54 1999 — 2301

INVOKE FILE : /home/apts/dat/apts0001_cl.dat — 2302

SEQ TIME KIND MESSAGE — 2303

1  13:44:54.701 CLIENT * * * * * CLIENT TP INVOKE START * * * * * — 2304
2  13:44:54.744 CLIENT OPERATION = op00 — 2305
3  13:44:54.746 CLIENT CORBA_NVList_add_item = p1 — 2306
4  13:44:54.747 CLIENT CORBA_NVList_add_item = p2 — 2307
5  13:44:54.774 CLIENT CORBA Request_send — 2308
6  13:44:54.821 CLIENT CORBA Request_get_response — 2309
7  13:44:54.823 CLIENT Nomal End — 2310
8  13:44:54.823 CLIENT * * * * * CLIENT TP INVOKE END * * * * * — 2311

DISTRIBUTED-OBJECT DEVELOPMENT SYSTEM AND COMPUTER-READABLE RECORDING MEDIUM RECORDED WITH PROGRAM FOR MAKING COMPUTER EXECUTE DISTRIBUTED-OBJECT DEVELOPMENT

FIELD OF THE INVENTION

The present invention relates to a distributed-object development system for supporting the development of client/server applications by object-oriented programming in a distributed object system in which objects that are distributed in a network function as a total by mutual co-operation and a computer-readable recording medium recorded with a program for making a computer execute the development of distributed objects.

BACKGROUND OF THE INVENTION

In recent years, along with improvement in the arrangement of communication infrastructures and wide distribution of LANs (local area networks) and internet services, there have been progressed remarkable developments in distributed computing systems from which terminal computers can enjoy desired services via a network. According to a conventional integrated data-processing type host-computer system, a high-performance host computer has carried out a necessary processing for the utilization of a database or for a complex calculation. Based on this arrangement, a plurality of terminals connected to the host computer have been able to enjoy desired services.

The distributed computing system that has replaced the host-computer system utilizes high-performance personal computers (PCs) and workstations (WSs) that are available at low cost in recent years. In the distributed computing system, server machines provide highly reliable services by high-speed processing of large volume of data. Client machines such as the PCs and the WSs carry out data processing and take user interfaces in this system. These client machines and server machines are connected together by a network. In this way, the distributed computing system achieves what is called a client/server system based on the distributed processing.

A network programming for achieving the distributed computing is usually carried out based on an RPC (a remote procedure call). The RPC is a programming for calling procedures (such as functions) that are located at different positions of the network. Procedures for utilizing the network are prepared in each server as a library. Through this library, clients can utilize the network.

Therefore, when the library of the procedures is arranged in each server, it is possible to carry out a network programming without being conscious about the network structure, protocols and communications between processes. Based on this RPC, a client can feel as if the procedures in the server were at the client side, and it is possible to shelter data transfers in the network and data conversions between the machines.

However, as the scale of the network becomes larger and the applications for providing the above services become higher functional, there have been problems of increase in the communication traffics and increase in the load of servers. Further, the development of applications becomes more complex. Particularly, the application development has so far been progressed by using development languages and development tools that are different for each operating system (OS). However, when the network has become widely distributed, the conventional method of separately carrying out the application development and the build up of installation environment including communication and resource management and fault measures becomes a heavy load on the application development staffs. This method also provides a lot of difficulties to these development staffs.

In order to solve these problems, a distributed object technique for further increasing the distribution of processing units and reutilization of application components in the network programming has come to attract attention. In this case, the object refers to a program having data and a processing procedure (called a method or an operation) integrated together. In the distributed object system, objects can dynamically structure a client/server relationship for a certain processing and carry out this processing so that the total network can function as one huge computer.

As a representative architecture of distributed objects, there is CORBA (Common Object Request Broker Architecture) set forth by OMG (The Object Management Group) that is an object-oriented technique standardization group in the USA. A standard specification of the distributed object management provided by a CORBA will be explained below.

Originally, there was proposed a mutual communication system called an ORB (Object Request Broker) as a framework for sharing application components that are distributed on the network. Based on the ORB, a program for executing a service on the network is regarded as an object. A client program (that is, a client object) can call a method of a server object on the same machine or on the network through this ORB without being conscious about where this method is located.

The ORB manages the information about the machine on the network in which an object exists. It is not necessary to designate the name of the machine at the time of calling a service. Therefore, in the case of moving a certain service from one machine to a separate machine in the application that utilizes the ORB, all what is needed for a client is to change the setting of the service on the ORB without the need for changing the program. This makes it possible to improve the flexibility of the application.

Accordingly, a client sends via the ORB a processing request to an object that the client wants to utilize. The object that has received this request executes the processing and returns a result of the processing to the client via the ORB. In this case, the client means a user of an object, and a server is a provider of the object that is utilized. (This object will hereinafter be called an object implementation in order to distinguish between this object and a general object.) A separate server may become a client of an object implementation. Therefore, the object on the ORB may become a client object or a server object depending on the situation.

Further, distributed objects on the ORB need to be able to be described in the form independent of a program language as well as being able to be dependent on machine and system languages. Therefore, this requirement is met by introducing a language called IDL (an interface definition language). Unlike other languages, the IDL is an exclusive language for defining only the interface. This IDL declares a set of operations, exceptions and attributes. Each operation consists of signatures that define a name, a parameter, a result and exceptions.

The CORBA is a standardization specification of the ORB. Particularly, at the time of sending a request from a client to the ORB, the language (C, C++ or the, like) of a program at the client side (a client application) is combined with the ORB to facilitate communications of messages between both parties. This method is called binding. There are two types of binding methods, a static startup and a dynamic startup. In order to design an object of the CORBA, at first, only a publicized function of the object is defined by using the IDL. Based on this IDL, various programming languages are loaded.

FIG. 26 is a block diagram that shows an interface structure of the ORB in the CORBA. The interface of the CORBA shown in FIG. 26 consists of an ORB core 2600, a dynamic startup interface 2650, a client stub 2660, an ORB interface 2670, an object adapter 2680, a server skeleton 2690, an interface repository 2630, and an implementation repository 2640.

In FIG. 26, the ORB core 2600 is for performing communications between a client 2610 and a server (an object implementation) 2620 without depending on a position. In general, the ORB core 2600 is interpreted to have a function of defining an object bus. This object bus can be expanded by the interface repository 2630, the implementation repository 2640 or other CORBA services.

At the time of a dynamic startup, the dynamic startup interface 2650 takes out information on the type of an object to be linked at the time of executing the object (hereinafter to be referred to as a target object) and calls the target object. The interface specification of the dynamic startup is common to each object.

The client stub 2660 is a function mapped with an interface definition of the target object. This defines a method for the client 2610 to start the target object on the server 2620. Therefore, when the client application is prepared, the client stub 2660 is generated in advance for each type of target object. The client stub 2660 is for calling the target object at the time of carrying out the static startup.

The ORB interface 2670 is an interface for operating the ORB, and this consists of a few APIs (Application Programming Interfaces) for local services that are required by the application. For example, the ORB interface 2670 provides the API that converts an object reference for referring to an object into a character string or for carrying out the opposite conversion.

The object adapter 2680 receives a request for a service on behalf of an object implementation, generate the object implementation, transfers the request to the object implementation, and provides an execution environment for allocating an object reference. Particularly, when a target object has been called at first in the ORB, a process is generated (that is, an object is activated). The object adapter 2680 mainly activates and inactivates the object.

The server skeleton 2690 provides a static interface to respective services that are exported by the server 2620. In other words, the server skeleton 2690 restores the structure converted by the client stub 2660, into an original function call format, and calls the implementation code of the target object. The server skeleton 2690 is generated together with the client stub 2660 by using an IDL compiler.

Although not shown in FIG. 26, it is assumed that a dynamic skeleton interface for providing the server with a function equivalent to that of the dynamic startup interface 2650 at the client side, is also included in the server skeleton 2690. This dynamic skeleton interface is the API for providing a method of delivering a request from the ORB to the object implementation when the implementation type of the target object is not clear at the time of generating a client application.

At the time of a dynamic startup, the interface repository 2630 stores in the form of an object the interface information prepared in the IDL to be taken out at the time of executing the object. The implementation repository 2640 provides the class to be supported by the server 2620, the generated object, and the repository at the time of executing the object.

Next, the development of the client application in the distributed object system based on the above-described CORBA specification will be explained. FIG. 27 is a flowchart that shows a conventional process of developing a client application. Particularly, the flowchart in FIG. 27 shows the process of developing the client application for carrying out the static startup.

Referring to FIG. 27, at first, a client application development staff designs a program interface of a client application to be developed (at a step S2701). Then, the client application development staff prepares an IDL file of a function to be called in the client application, that is, an object class (at a step S2702). The IDL is a means for guiding a client candidate about what kind of operation the object can provide and how to start the object. The IDL defines a type of the object, attributes of the object, a method that the object exports, and a parameter of the method.

Then, the staff prepares a source of a desired client application to be executed by using the object class (at a step S2703). For executing the client application, a server is necessary that provides the object class. Therefore, a server application is necessary in order to verify or test the execution of the client application that has been prepared at the step S2703.

However, when the server application that has been in actual operation on the network is used for verifying the execution of the program, there is a risk that this server application is destroyed depending on the client application tested or that this gives inconvenience to other objects on the network. Therefore, the use of the server application for the verification in this way is not practical.

In order to solve this problem, usually, a test server application is prepared (at a step S2704). The verification of the execution of the prepared client application is carried out under the environment that this test server application has been started.

Next, the IDL file that has been prepared at the step S2702 is compiled by using an IDL compiler, thereby to generate a client stub, a server skeleton and an IDL object (at a step S2705). The IDL object is combined with the interface repository (at a step S2706), and thus becomes IDL information that is used at the time of carrying out the dynamic startup.

The client application that has been prepared at the step S2703 is compiled to generate an object. This object is linked with the client stub generated at the step S2705, thereby to obtain an executable client application file (at a step S2707).

Similarly, the test server application prepared at the step S2704 is compiled to generate an object. This object is linked with the server skeleton that has been generated at the step S2705, thereby to obtain an executable test server application file (at a step S2708).

The test server application that has been obtained at the step S2707 is stored in the implementation repository, and this test server application is also registered as an object implementation that can be called by the server application (at a step S2709).

In order to carry out the verification of the execution of the client application that has been prepared, a test data is prepared that becomes a text image to respond to a request transmitted from the client (at a step S2710). Next, the test server application registered at the step S2709 is started (at a step S2711). In this state, the client application generated at the step S2707 is executed, and a result of this execution is verified (at a step S2712).

On the other hand, in the case of developing the server application, it is also necessary to prepare a test client application in a similar manner to that for the development of the client application as described above. FIG. 28 is a flowchart that shows a conventional process of developing the server application. The flowchart of FIG. 28 also shows the process of developing the server application for carrying out the static startup.

Referring to FIG. 28, at first, a server application development staff designs a program interface of a server application to be developed (at a step S2801). Then, the server application development staff prepares an IDL file of a function to be called in the server application, that is, an object class (at a step S2802).

Then, the staff prepares a source of a desired server application to be executed by using the object class and a source of a test server application (at steps S2803 and S2804). Next, the IDL file that has been prepared at the step S2802 is compiled by using an IDL compiler, thereby to generate a client stub, a server skeleton and an IDL object (at a step S2805). The IDL object is combined with the interface repository (at a step S2806).

The server application that has been prepared at the step S2803 is compiled to generate an object. This object is linked with the client stub generated at the step S2805, thereby to obtain an executable server application file (at a step S2807).

Similarly, the test client application prepared at the step S2804 is compiled to generate an object. This object is linked with the client stub that has been generated at the step S2805, thereby to obtain an executable test client application file (at a step S2808).

The server application that has been obtained at the step S2808 is stored in the implementation repository, and this server application is also registered as an object implementation that can be called by the test client application (at a step S2809).

In order to carry out the verification of the execution of the server application, a test data (a text image) to be transmitted from the test client application to the server application is prepared (at a step S2810). Next, the server application registered at the step S2809 is started (at a step S2811). In this state, the test client application generated at the step S2807 is executed, and an operation result of the server application obtained according to this execution is verified (at a step S2812).

As explained above, the distributed object system uses a client/server model as a basic structure. Therefore, for the execution of an application, usually a client and a server are necessary as a pair. At the stage of development of an application, in order to verify the execution of an application that has been prepared, it is also necessary to prepare the application that operates on the client and the server as a pair.

As another method of developing an application in the distributed object system, there has been proposed, for example, "A system and a method for a distributed debugging for debugging distributed application programs" as disclosed in Japanese Patent Application Laid-open Publication No. 9-120366. According to this "A system and a method for a distributed debugging for debugging distributed application programs", a debugger engine is made resident in each of local computers and remote computers under a distributed object environment based on the CORBA. Also, a debugger GUI is provided in at least one of these local computers and remote computers.

The debugger GUI communicates with the debugger engines based on the communication mechanism so that a client application can use the debugger in the local host. The debugger can debug in seamless the applications that include objects and object implementations that operate in remote computers.

However, according to the distributed object system based on the CORBA, it is not the development staff but the ORB that recognizes a position of the application (object) and the interface that becomes the communication party. Except a special case that the client application development staff is also the server application development staff, the development staff is required to communicate with unknown objects disposed on unknown host systems.

In other words, according to the CORBA-based system, the client application does not directly obtain the position where the target object is disposed, and the client application can only use the target object. In general, the application development staff of the CORBA-based system cannot find the server that is relevant to his or her own object.

Therefore, in order to develop an application that is operated on the distributed object system based on the CORBA specification, it has been necessary to prepare a test client application or a test server application separate from a target client application or a target server application, as described above. In order to increase the reliability of the verification of the execution of the target application, it is not allowed to include a bug in the test application. Therefore, this requirement has been a very heavy load on the application development staff.

Further, according to the distributed object system based on the CORBA specification, the above-described IDL is introduced in order to eliminate the dependence on the application language and the OS dependence. On the other hand, the application development staff is required to master the language called the IDL in addition to the application program language. The staff also needs to verify that the IDL has been correctly input and output in the verification of the execution of the prepared application. According to the conventional procedures for developing applications shown in FIGS. 27 and 28, the environment for developing the client application and the environment for developing the server application are not separated. Therefore, it is not possible to completely reenact the application operation particularly on the ORB under the actual environment of the distributed objects via the network. Accordingly, it has been necessary to prepare a client request or a server response according to the architecture (such as the OS) dependent on the system (host system) that actually carries out the verification of the execution.

Further, according to the "A system and a method for a distributed debugging for debugging distributed application programs" as disclosed in Japanese Patent Application Laid-open Publication No. 9-120366, the debugging is realized under the environment of the actual distributed objects. Therefore, it is possible to carry out a more reliable verification of the execution of the application. On the other hand, there is a risk that the existence of a bug gives a bad influence to other nodes (other clients or servers) connected to the network.

Further, it is necessary to mount a debugger machine onto the machine of the server application or the client application that forms a pair with the server application or the client application of which execution is to be verified. However, when it is not possible to know an accurate position of the target object based on the CORBA specification, particularly when a dynamic startup is to be carried out, it is not practicable to mount a debugger machine on each of the servers that have target objects.

SUMMARY OF THE INVENTION

It is an object of the present invention to provide a distributed-object development system and a computer-readable recording medium recorded with a program for making a computer execute the distributed-object development system, where the distributed-object development system is equipped with a simulator in each of a client application that forms a pair with a server application of which execution is to be verified and a server application that forms a pair with a client application of which execution is to be verified, thereby to avoid the need for a development of a test application, and the distributed-object development system is capable of dividing the environment of developing the client application from the environment of developing the server application, and is also capable of building up an environment for developing applications on a desired host system.

With a view to solving the above problems and in order to achieve the above object, according to a first aspect of the present invention, there is provided a distributed-object development system for developing a client application to be executed by a client that is one of nodes for calling an object and a server application to be executed by a server that is one of the nodes for providing services by the object under a distributed-object environment where the objects are distributed to the plurality of nodes on a network, the distributed-object development system comprising an application simulator (corresponding to a server simulator or a client simulator to be described later) that defines information on the type of the object, obtains interface definition information for intermediating between the client application and the server application, and simulates the calling of the object or the execution of the object based on the obtained information. Therefore, it becomes possible to automatically generate a test data (corresponding to an information file to be described later) that is necessary for executing a test application that forms a pair with the application of which execution is to be verified. Further, this test data is used as a communication message for calling the object and/or executing the object. Therefore, it is possible to automatically build up a server simulator or a client simulator.

According to a second aspect of the invention, there is provided a distributed-object development system for developing a client application to be executed by a client that is one of nodes for calling an object and a server application to be executed by a server that is one of the nodes for providing services by the object under a distributed-object environment where the objects are distributed to the plurality of nodes on a network, the distributed-object development system comprising a server application simulator (corresponding to a server simulator to be described later) that defines information on the type of the object, obtains interface definition information for intermediating between the client application and the server application, generates a response (corresponding to return information to be described later) in reply to a call request for the object issued by the client application based on the obtained information, and transmits the generated response to the client application. Therefore, it is possible to automatically build up a function for simulating the server application.

Further, the distributed-object development system comprises a client application simulator (corresponding to a client simulator to be described later) that obtains the interface definition information, generates the call request for the object (corresponding to startup information to be described later) based on the obtained information, transmits the generated request to the server application, and receives a response transmitted from the server application in reply to the request. Therefore, it is possible to automatically build up a function for simulating the client application.

Further, according to a third aspect of the invention, there is provided a distributed-object development system according to the above second aspect, wherein at least one of the plurality of nodes is equipped with the server application simulator (corresponding to the server simulator to be described later) or the client application simulator (corresponding to the client simulator to be described later), and a desired node out of the rest of the nodes other than the above node controls the simulation function of the server application simulator and/or the client application simulator via the network. Therefore, it is possible to dispose the application to be tested and the application to be simulated separately on the network.

Further, according to a fourth aspect of the invention, there is provided a distributed-object development system according to the above third aspect, wherein a simulation function (a simulation program to be described later) for the server application simulator (corresponding to the server simulator to be described later) and the client application simulator (corresponding to the client simulator to be described later) is provided on a WWW (Worldwide Web) server that is one of the nodes, and one other node out of the rest of the nodes controls the simulation function via a WWW Browser. Therefore, it is possible to provide an operation based on the GUI display on the WWW Browser.

Further, according to a fifth aspect of the invention, there is provided a distributed-object development system according to one of the above second to the fourth aspects, wherein the server application simulator (corresponding to the server simulator to be described later) prepares a verification file that includes the contents of the call request for the object (corresponding to startup information to be described later) issued by the client application and the contents of the generated response (corresponding to an execution log to be described later). Therefore, it is possible to verify an error in the design of a developed client application by referring to the verification file.

Further, according to a sixth aspect of the invention, there is provided a distributed-object development system according to the above fifth aspect, wherein, when the contents of the call request for the object (corresponding to the startup information to be described later) issued by the client application do not coincide with a type according to the definition of the interface, the server application simulator (corresponding to the server simulator to be described later) prepares the verification file by adding the information showing non-coincidence of type to the contents of the generated response (corresponding to the execution log to be described later). Therefore, it is possible to find easily an error in the design of a developed client application by referring to the verification file.

Further, according to a seventh aspect of the invention, there is provided a distributed-object development system according to one of the above second to the fourth aspects, wherein the client application simulator (corresponding to the client simulator to be described later) prepares a verification file that includes the contents of the generate response (corresponding to the execution log to be described later) and the contents of the response (corresponding to the return information to be described later) transmitted from the server application in reply to a call request. Therefore, it is possible to verify an error in the design of a developed server application by referring to the verification file.

Further, according to an eighth aspect of the invention, there is provided a distributed-object development system according to the above seventh aspect, wherein, when the contents of the response (corresponding to the return information to be described later) returned from the server application do not coincide with the type according to the definition of the interface, the client application simulator generates the verification file by adding the information showing non-coincidence of type to the contents of the generated request (corresponding to the execution log to be described later). Therefore, it is possible to find easily an error in the design of a developed server application by referring to the verification file.

According to a ninth aspect of the present invention, there is provided a computer-readable recording medium recorded with a program for developing a client application to be executed by a client that is one of nodes for calling an object and a server application to be executed by a server that is one of the nodes for providing services by the object under a distributed-object environment where the objects are distributed to the plurality of nodes on a network, wherein the recording medium is recorded with a program that executes an interface information obtaining procedure for obtaining interface definition information that defines information on the type of the object and intermediates between the client application and the server application, and a simulation procedure for simulating the calling of the object and/or the execution of the object based on the obtained interface information. Therefore, it is possible to automatically build up a function for simulating the server application.

According to a tenth aspect of the present invention, there is provided a computer-readable recording medium recorded with a program for developing a client application to be executed by a client that is one of nodes for calling an object and a server application to be executed by a server that is one of the nodes for providing services by the object under a distributed-object environment where the objects are distributed to the plurality of nodes on a network, wherein the recording medium is recorded with a program that executes a selection procedure for selecting the simulation of either the server application or the client application, and an interface-information obtaining procedure for obtaining interface definition information that defines information on the type of the object and intermediates between the client application and the server application. Therefore, it is possible to automatically build up a function for simulating the server application.

Further, the recording medium is recorded with a response generation procedure for generating a response according to a call request for the object from the client application based on interface information obtained in the interface information obtaining procedure, when the simulation of the server application has been selected in the selection procedure, a server simulation procedure for transmitting to the client application the response generated in the response generation procedure, a request generation procedure for generating a call request for the object based on interface information obtained in the interface information obtaining procedure, when the simulation of the client application has been selected in the selection procedure, and a client simulation procedure for transmitting to the server application a request generated in the request generation procedure and receiving a response transmitted from the server application according to the request. Therefore, it is possible to automatically build up a function for simulating the server application.

Other objects and features of this invention will become understood from the following description with reference to the accompanying drawings.

BRIEF DESCRIPTION OF THE DRAWINGS

FIG. 8 is a diagram that shows an IDL to be used for explaining the distributed-object development system relating to the present invention.

FIG. 12 is a diagram for explaining a display example of startup information in the server simulator in the distributed-object development system relating to the present invention.

FIG. 14 is a diagram for explaining a display example of an execution log in the server simulator in the distributed-object development system relating to the present invention.

FIG. 22 is a diagram for explaining a display example of return information in the client simulator in the distributed-object development system relating to the present invention.

FIG. 24 is a diagram for explaining a display example of an execution log in the client simulator in the distributed-object development system relating to the present invention.

DESCRIPTION OF THE PREFERRED EMBODIMENTS

Embodiments of a distributed-object development system and a computer-readable recording medium recorded with a program for making a computer execute the development of distributed objects will be explained in detail below with reference to the drawings. It should be noted that the invention is not limited to these embodiments.

Figure 1:
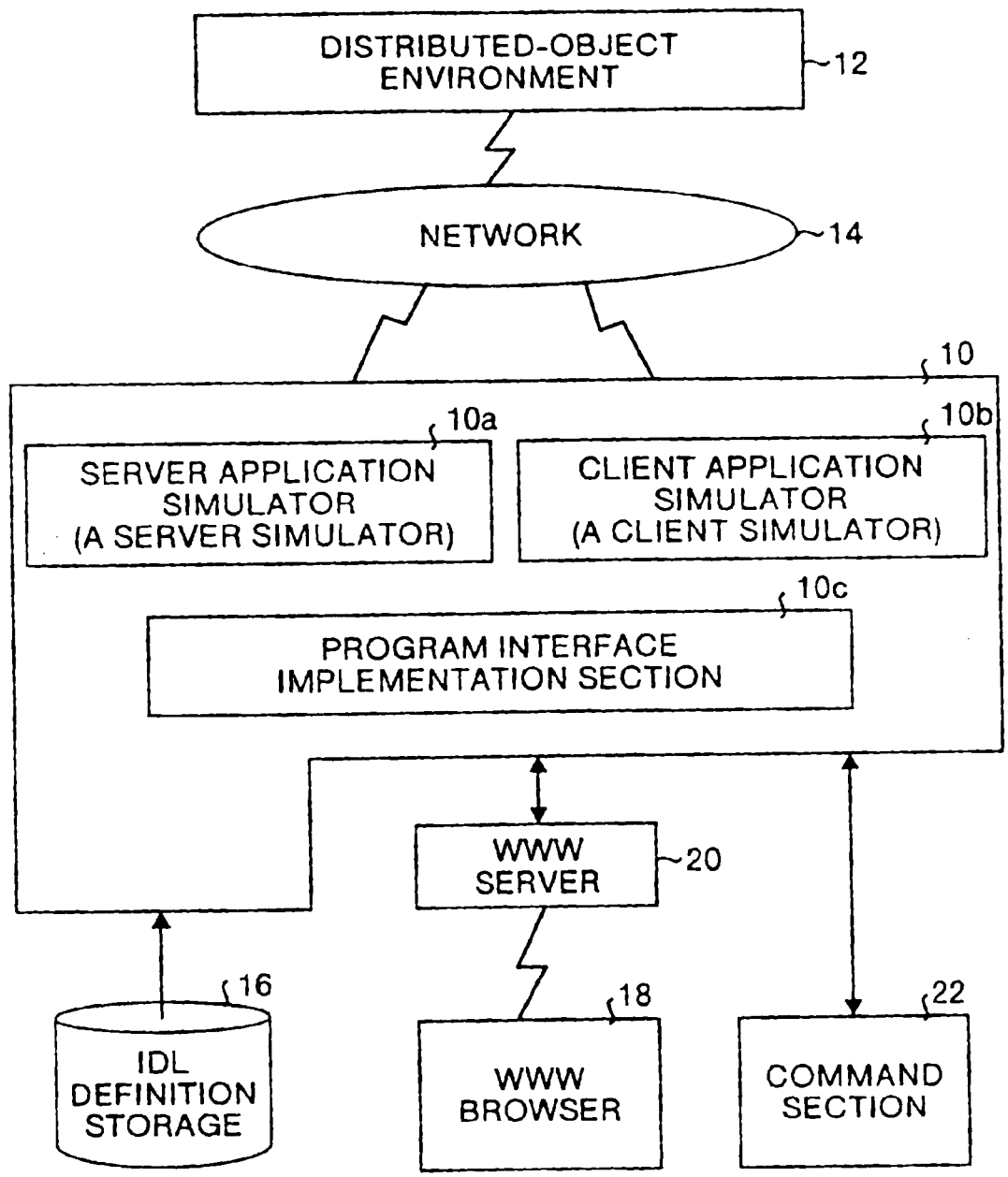
FIG. 1 is a block diagram that shows a schematic structure of a distributed-object development system relating to the present invention.

FIG. 1 is a block diagram that shows a schematic structure of a distributed-object development system relating to the present invention. In FIG. 1, a plurality of nodes such as PCs, WSs, host computer, etc., each being equipped with an object as a part of distributed objects, are connected to a network 14 built up based on communication protocols such as IIOP that are network protocols for communications between ORBs according to MG specifications. Thus, a distributed-object environment 12 has been established based on the CORBA or the like. Under this environment, the distributed-object development system is constructed by a simulator machine 10 that is connected to the network 14 as one of the node, and an IDL definition storage 16 that is used for achieving the functions of a client simulator and a server simulator in the simulator machine 10.

The simulator machine 10 is further equipped with a server application simulator 10a that provides a test server application, or the function of a server simulator, automatically generated based on IDL information obtained from the IDL definition storage 16, a client application simulator 10b that provides a test client application, or the function of a client simulator, automatically generated based on IDL information obtained from the IDL definition storage 16, and a program interface implementation section 10c that automatically builds up the test server application and the test client application and carries out communication control of external units including the nodes connected to the simulator machine 10.

The IDL definition means the IDL information, and this defines the interface between the client application and the server application. The IDL definition storage 16 is disposed on the network 14 as one of the nodes, or is connected as an external device of the simulator machine 10.

The simulator machine 10 is operated by a user via a command section 22. The simulator machine 10 can operate according to various kinds of instructions given by the command section 22. The simulator machine 10 is connected to a WWW (Worldwide Web) server 20 that is one of the nodes. When a WWW Browser 18 that has been activated by other node makes access to the WWW server 20, the user can enjoy the function (the server simulator or the client simulator) provided by the simulator machine 10 on the WWW Browser 18.

In other words, it is also possible to operate the simulator machine 10 from a remote node via the network 14, as well as to operate it via the command section 22. Particularly, when the WWW Browser 18 is utilized, the above function is realized as an external program for providing services to the WWW Browser 18 by the WWW server 20. In this case, the WWW server 20 can utilize the external program or the function of the simulator machine 10 via a CGI (Common Gateway Interface) or an API.

Therefore, according to the distributed-object development system relating to the present invention, when the application development staff wants to develop a client application, the simulator machine 10 can simulate a test server application that is necessary for verifying the execution of the client application. When the application development staff wants to develop a server application, the simulator machine 10 can simulate a test client application that is necessary for verifying the execution of the server application.

Further, this simulation function can be executed from a desired node via the WWW server 20. This means that it is possible to develop applications on a node which can be connected to a wide range of a network such as an Internet, and that it is not necessary to install a program having a simulation function at each node that is used by the application development staff.

In order to verify the execution of a client application that is an application for calling a target object disposed at any one of the distributed nodes, or in order to execute a server application that is an application having a target object that is called from the client application like the applications operated under the distributed-object environment, it is basically necessary to communicate with a remote node via the network. However, according to the distributed-object development system relating to the present invention, it is possible to automatically build up on the own node a test application that simulates the transmission and reception of a request for the target object, by obtaining the IDL information on the target object from the IDL definition section 16.

The processes of developing a client application and a server application by using the distributed-object development system will be explained below. Then, the operation of the server application simulator (hereinafter to be referred to as a server simulator) and the operation of the client application simulator (hereinafter to be referred to as a client simulator) that are necessary for the development of these applications will be explained with reference to screens that are displayed on the WWW Browser 18.

(Process of Developing a Client Application)

Figure 2:
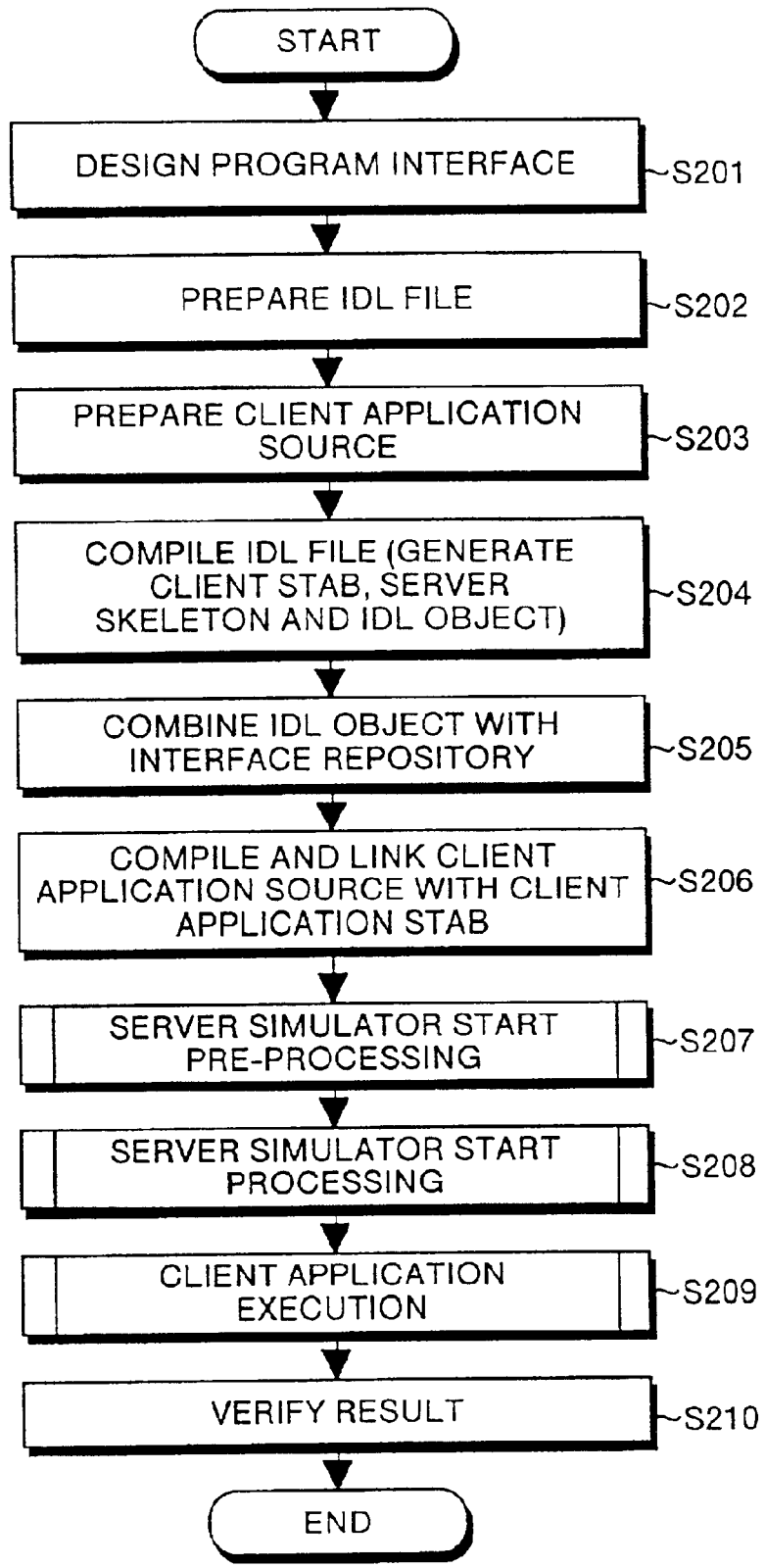
FIG. 2 is a flowchart that shows a process of developing a client application by the distributed-object development system relating to the present invention.
Figure 27:
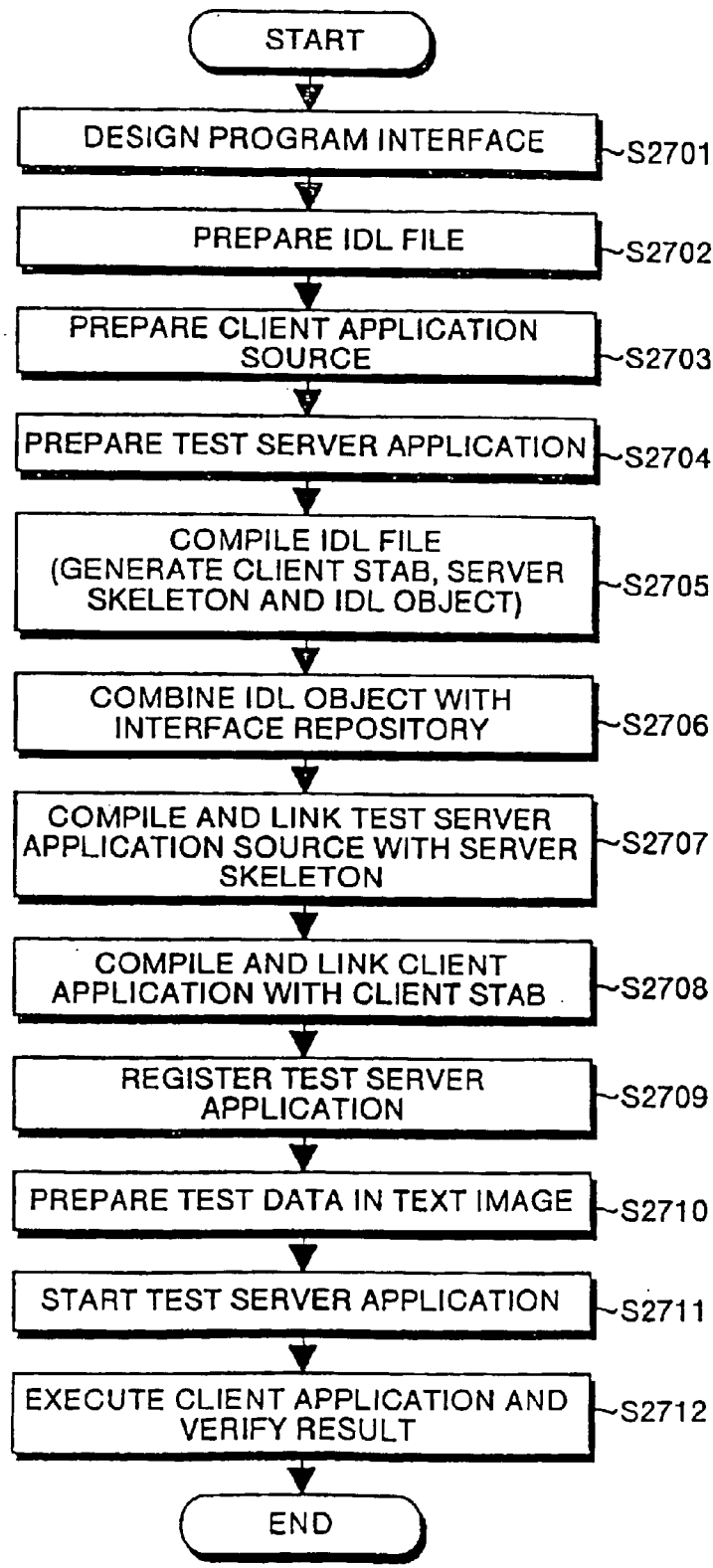
FIG. 27 is a flowchart that shows a conventional process of developing a client application.

At first, the process of developing a client application by using a server simulator in the distributed-object development system relating to the present invention will be explained in relation to the conventional process of developing a client application shown in FIG. 27. FIG. 2 is a flowchart that shows the process of developing a client application by the distributed-object development system relating to the present invention. Particularly, the flowchart in FIG. 2 shows the process of developing a client application for carrying out the static startup.

Referring to FIG. 2, first, a client application development staff designs a program interface of a client application to be developed (at a step S201). Then, the client application development staff prepares an IDL file of a function to be called in the client application (at a step S202).

Then, the staff prepares a source of a desired client application to be executed by using the IDL file (at a step S203). Next, the IDL file that has been prepared at the step S202 is compiled by using an IDL compiler, thereby to generate a client stub, a server skeleton and an IDL object (at a step S204). The generated IDL object is combined with the interface repository (at a step S205).

The source of the client application that has been prepared at the step S203 is compiled to generate an object. This object is linked with the client stub generated at the step S204, thereby to obtain an executable client application file (at a step S206).

Then, a pre-processing for starting the server simulator is executed (at a step S207), and thereafter, a processing for starting the server simulator is executed (at a step S208). Each of the server simulator start pre-processing and the server simulator start processing corresponds to the processing to be realized by the distributed-object development system relating to the present invention. Details of each processing will be explained later.

After the server simulator has been started, the client application that has been generated as the executable file at the step S206 is executed (at a step S209). The client application to be executed in this case has the same code as that actually mounted under the distributed-objet environment. It is not particularly necessary to add changes for the test. In other words, the client application of a binary source that can be operated on the CORBA without problem is executed. Then, a result of the execution of the client application is verified (at a step S210).

Figure 3:
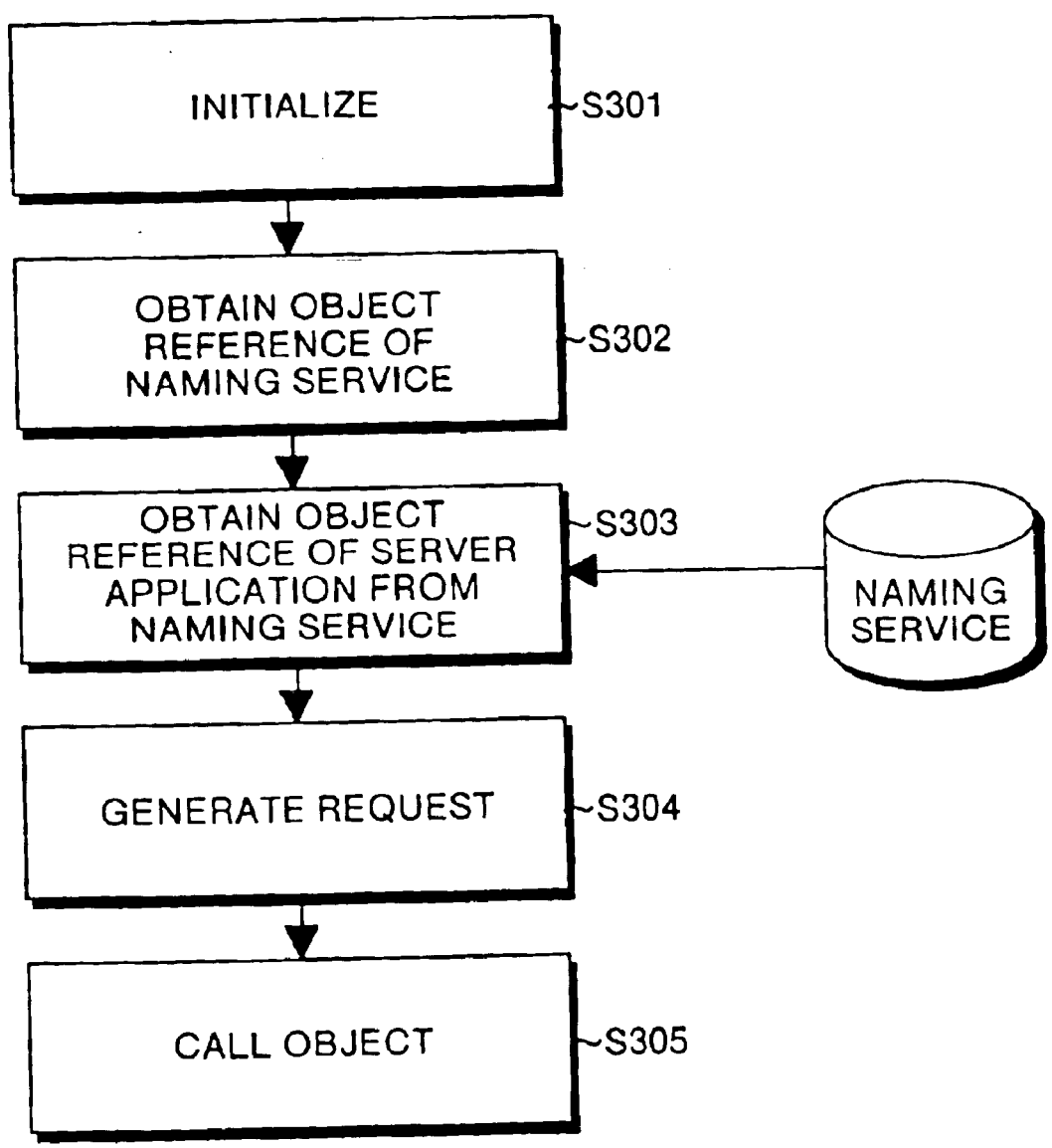
FIG. 3 is a flowchart for explaining the execution processing of a client application.

FIG. 3 is a flowchart for explaining the execution processing of this client application. Particularly, FIG. 3 shows a processing to be carried out by the client stub for conducting a static startup. Referring to FIG. 3, at first, the client application is initialized, and a call request for an object is transmitted to the client stub based on the needs (at a step S301). Based on the CORBA specification, the calling of this object, or the target object, is all carried out by using a reference ID that is called an object reference on the ORB. Therefore, it is necessary to obtain the object reference of this target object.

However, the client application designates the target object by using an object name prepared by a character string. Therefore, it is necessary to obtain the object reference corresponding to this object name. As the CORBA has a naming service for providing an object reference corresponding to the object name, this naming service is usually used.

However, as the naming service is also one of the objects on the CORBA, it is necessary to obtain in advance an object reference of this naming service (at a step S302). Thus, it becomes possible to access the naming service, and it is possible to obtain the object reference of the target object (the server simulator based on a broad definition (at a step S303).

Then, the client stub generates a request to be transmitted to the ORB core by using the object reference of the target object that has been obtained at the step S303 (at a step S304). The object adapter receives this request, and the object is called by the server skeleton corresponding to the target object included in the request (at a step S305).

In actual practice, after the step S305, the server skeleton receives return data from the called object, and transmits the return data again to the client that is the request transmission source, via the ORB core. However, according to the distributed-object development system relating to the present invention, this processing is carried out by the server simulator. Accordingly, the server simulator simulates the function of the server skeleton.

After the client application shown in FIG. 3 has been executed, the server simulator transmits the return data to the client, thereby to verify the result of the operation of the client application (at a step S210 shown in FIG. 2). Specifically, the data transmitted by the client application is compared with the data received by the server simulator to detect an error in the design of the client application.

(Operation of the Server Simulator)

Figure 4:
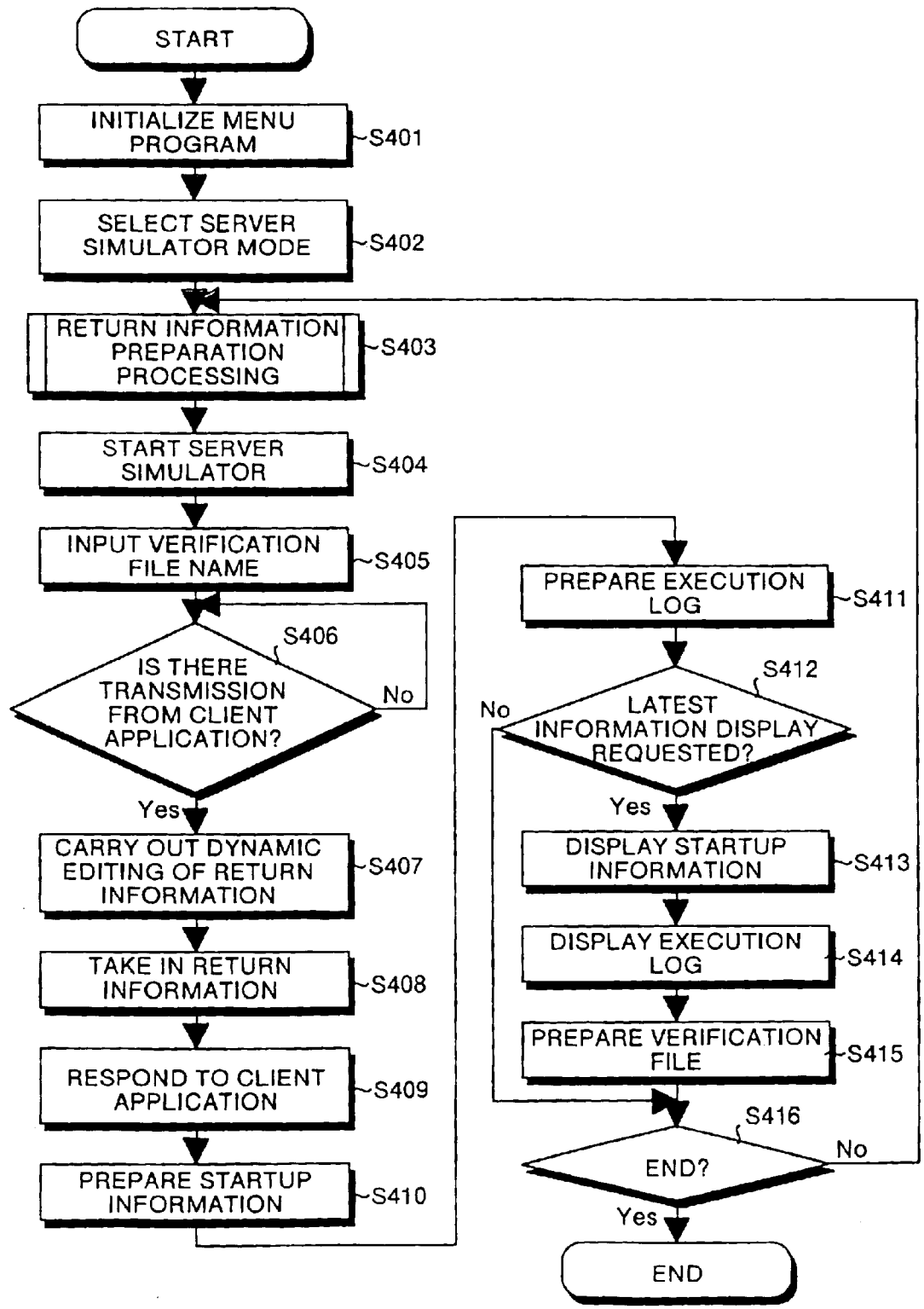
FIG. 4 is a flowchart that shows the operation of a server simulator of the distributed-object development system relating to the present invention.

The operation of the server simulator will be explained next. The operation of the server simulator corresponds to the server simulator start pre-processing and the server simulator start processing. FIG. 4 is a flowchart that shows the operation of a server simulator of the distributed-object development system relating to the present invention. Particularly, the control of the server simulator on the WWW Browser 18 will be explained.

Referring to FIG. 4, the application development staff at first starts the WWW Browser 18 by using one of the nodes (in most cases, a personal computer) under the distributed-object environment 12. Then, the staff inputs to the WWW Browser 18 a URL (Uniform Resource Locator) that shows the address of the WWW server 20 for accessing the WWW server 20 that provides a program for executing the function of the simulator machine 10 (hereinafter to be called a simulation program) as HTML (Hyper Text Makeup Language). Based on this operation, a menu program for selecting the function of the simulator machine 10 is started on the WWW Browser 18 (at a step S401).

Figure 5:
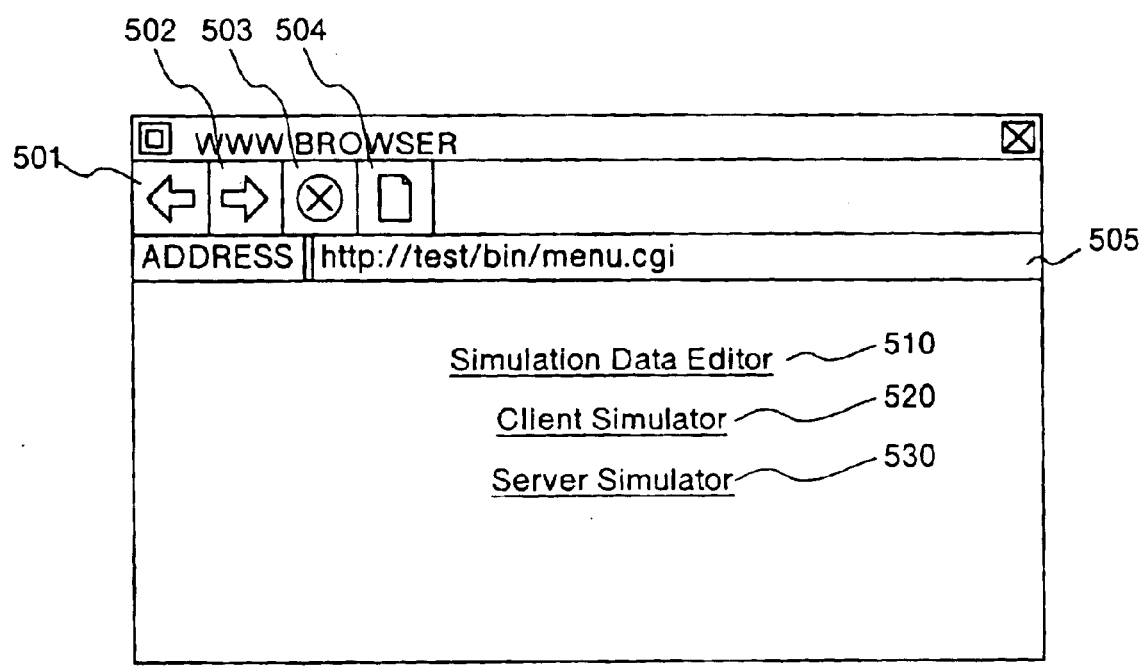
FIG. 5 is an explanatory diagram that shows a starting menu screen of the distributed-object development system relating to the present invention.

FIG. 5 is an explanatory diagram that shows a starting menu screen of the menu program that has been started at the step S401. Referring to FIG. 5, the URL is input to an address-input field 505. FIG. 5 shows a state that "http://test/bin/menu.cgi" has been input. Particularly, it can be known that the simulation program is connected to the WWW Browser 18 as an external program via the CGI.

In the WWW Browser 18 shown in FIG. 5, there are disposed a WWW page return button 501, WWW page proceed button 502, an access stop button 503, and a WWW page update button 504, in a similar manner to that of the GUI (Graphical User Interface) of the conventional WWW Browser that has been distributed. It is possible to select and secure each button and other selection item by using a pointing device like a mouse. It is also possible to input characters by using a keyboard.

As shown in FIG. 5, the menu provided by the simulation program is structured by selection items of "Simulation Data Editor" 510 for generating information data to be described later, "Client Simulator" 520 for starting a client simulator, and "Server Simulator" 530 for starting a server simulator.

Each of these selection items is linked to a page that shows the processing corresponding to that item. On the display screen of the WWW Browser 18, the address displayed in the address-input field 505 is actually updated each time when the page is updated. However, the display of such address is omitted in the display screen that is referred to in the following explanation.

In the distributed-object development system relating to the present invention, it is necessary to prepare the information file for automatically building up the server simulator before the server simulator is started. Therefore, at first, the "Simulation Data Editor" 510 is selected on the screen shown in FIG. 5.

The information file preparation processing gives an input format that is common to a server simulator and a client simulator. Therefore, it is necessary to indicate which one of the information file for the server simulator and the information file for the client simulator is to be prepared. This instruction may be carried out by dividing the "Simulation Data Editor" 510 in FIG. 5 into two selection items of "Client Simulation Data Editor" and "Server Simulation Data Editor", for example, and selecting a corresponding one of the selection items. Alternately, there may be additionally displayed a selection item for selecting one of a server simulator mode and a client simulator mode, after firming the selection of the "Simulation Data Editor" 510. This instruction can be suitably changed on design.

As the server simulator is to be started in this case, it is assumed that the server simulator mode is selected (at a step S402). Based on this selection, the processing proceeds to the return information preparation processing (at a step S403). The return information is a call name of the information file when the information file is prepared in the server simulator mode. Specifically, this return information shows the return information to be transmitted from the server to the client. In this case, the return information means the information that is returned by the server simulator to the client application.

(Return Information Preparation Processing)

Figure 6:
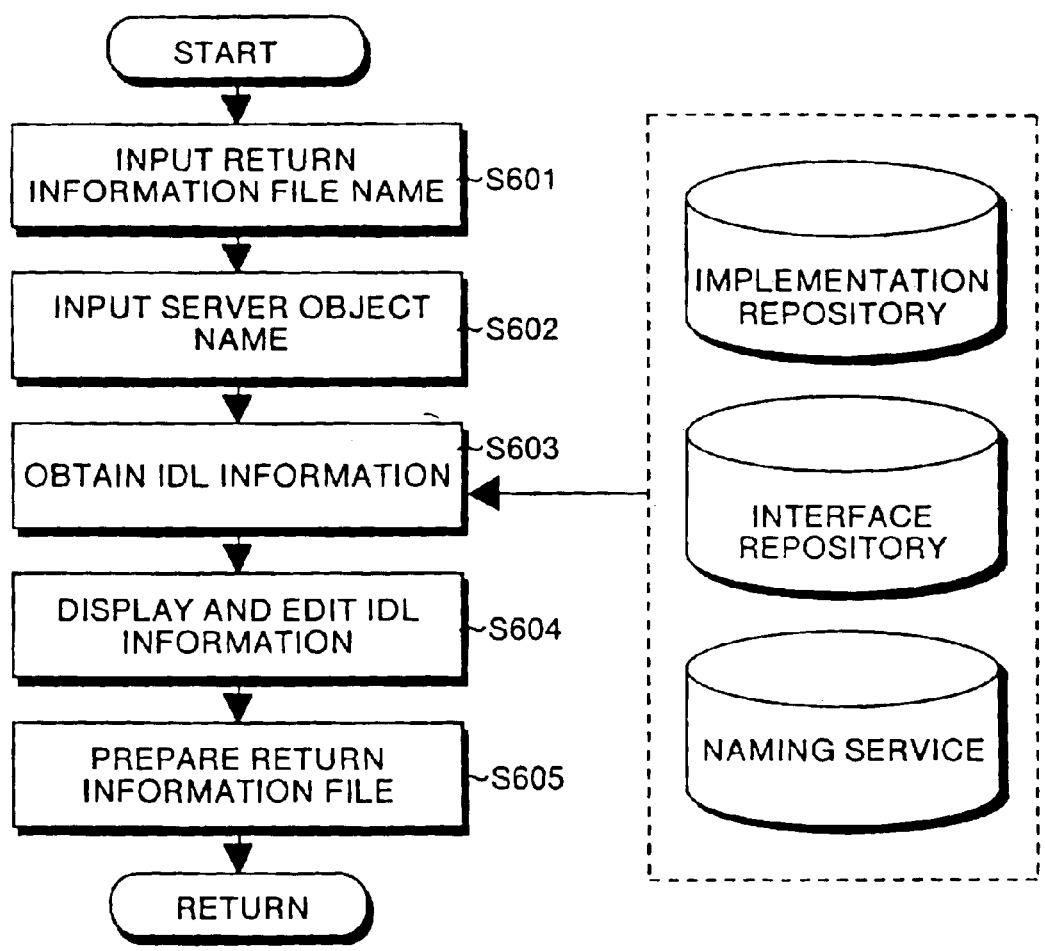
FIG. 6 is a flowchart that shows a process of preparing return information of a server simulator in the distributed-object development system relating to the present invention.
Figure 7:
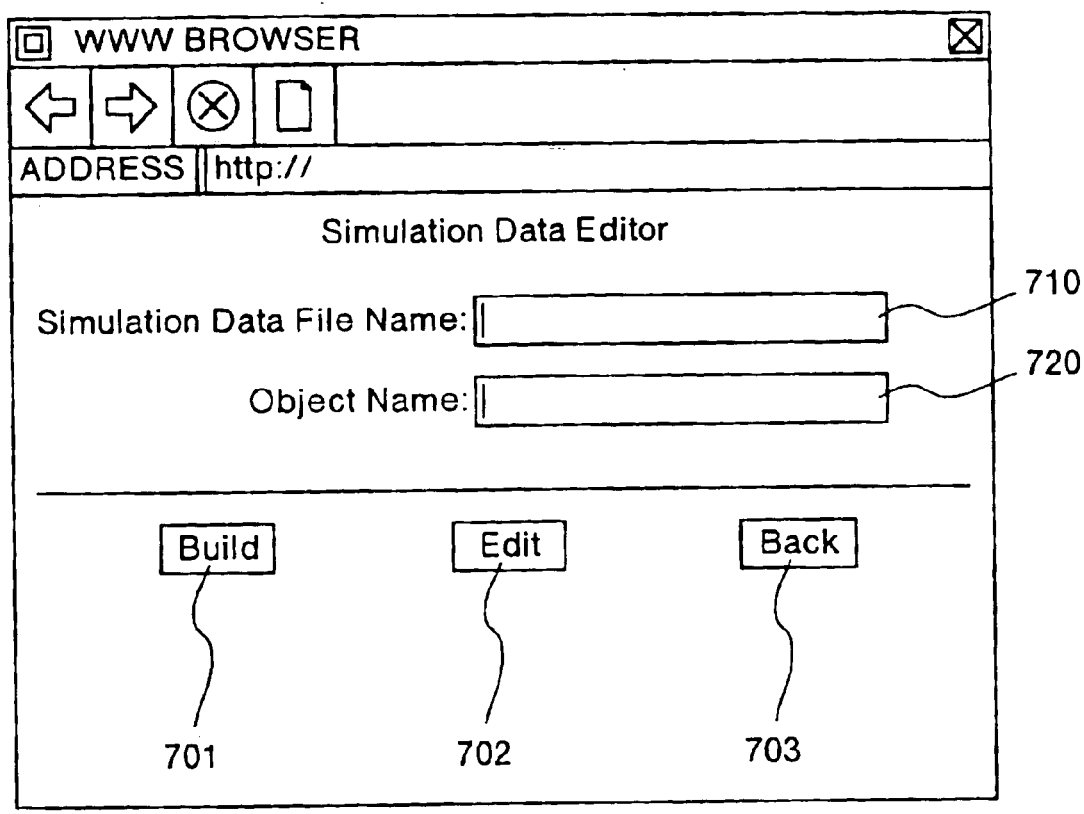
FIG. 7 is an explanatory diagram that shows an initial input screen in the information file preparation processing in the distributed-object development system relating to the present invention.

The return information preparation processing at the step S403 will be explained. This processing also corresponds to the server simulator start pre-processing at the step S207 shown in FIG. 2. FIG. 6 is a flowchart that shows the return information preparation processing of the server simulator at the step S403. FIG. 7 is an explanatory diagram that shows an initial input screen in the information file (the return information in this case) preparation processing.

On the screen shown in FIG. 7, a return information file name is input in an information file name input field 710 (at a step S601). This return information file name is a name of a file into which the return information to be prepared is stored, such as, for example, "/home/apts/dat/apt0001_sv.dat". This return information file name is referred to at the time of starting the server simulator to be described later.

Next, a server object name is input in an object name input field 720 (at a step S602). The object name is a name of a target object that is called by the client application and is simulated on the server simulator, such as, for example, "IDL:apts0001/apts0001:1.0".

When a "Build" button 701 is selected, the IDL information of the target object is obtained (at a step S603). The obtained information is displayed, and it becomes possible to edit the data (at a step S604). When a return information file already exists, the return information file name is input in the information file name input field, and an "Edit" button 702 is selected. Then, the return information file is displayed, and this file can be edited. When a "Back" button 703 in FIG. 7 is selected, it is possible to return to the menu screen shown in FIG. 5.

To facilitate the understanding of the distributed-object development system relating to the present invention, in the following explanation, the IDL definition of the target object is assumed to have a structure as shown in FIG. 8. It is assumed that the IDL shown in FIG. 8 is used in common to the explanation of the client simulator to be described later.

At the step S603, the IDL information is automatically obtained in the following process. At first, the naming service is accessed to obtain the object reference of the object name. Next, by using the object reference obtained, the implementation repository is accessed to confirm the implementation state of the target object. Then, by using the object reference, the interface repository is accessed to obtain the IDL information of the target object.

Figure 9:
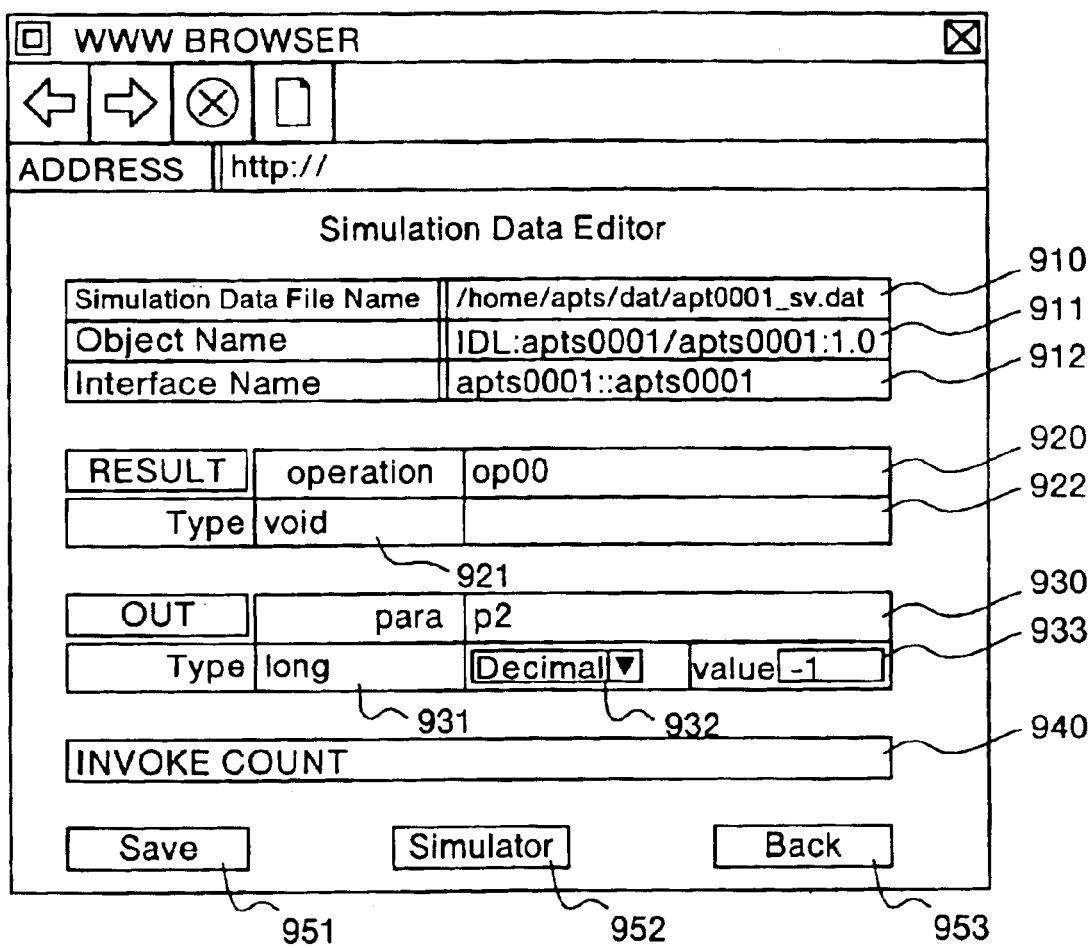
FIG. 9 is an explanatory diagram that shows an information-file edit screen in the distributed-object development system relating to the present invention.

FIG. 9 is an explanatory diagram that shows an information file edit screen (the return information in this case) displayed at the step S604. As shown in FIG. 9, on the information file edit screen, the information file name that has been input in the information file input field in FIG. 7 is displayed in an information file name display field 910. Further, the object name that has been input in the object name input field 720 in FIG. 7 is displayed in an object name display field 911. The interface name that shows a name of the target object actually registered in the naming service is displayed in an interface name display field 912.

Then, "op00" is displayed in an operation name display field 920 as the IDL information that has been obtained at the step S603 in FIG. 6 according to the IDL shown in FIG. 8. Then, "void" is displayed in a return value attribute display field 921. Similarly, "p2" is displayed in a parameter name display field 930, "long" is displayed in a parameter attribute display field 931, and "−1" is displayed in a parameter value display field 933.

As shown in FIG. 9, by using a base radix system selector 932, it is possible to change a base radix system for displaying a parameter in a parameter value display field 933. In FIG. 9, "Decimal" that shows a decimal radix is selected in the base radix system selector 932. When an attribute that requires a return value of "long" is displayed in the return value attribute display field 921, a base radix system selector and a return value display field similar to the radix system selector 932 and the parameter value display field 933 respectively are displayed in a display field 922.

By inputting a numerical value in a simulation repetition number input field 940 in FIG. 9, it is possible to continuously carry out a simulation to be described later by repeating the number of times shown by the input value.

When it is desired to end the display confirmation or the editing of the information filed edit screen shown in FIG. 9, a "Save" button 951 is selected. Then, the contents displayed on the screen are saved as the information file (the return file in this case) under the information file name displayed in the information file name display field 910. In this way, the return information file is prepared at a step S605 shown in FIG. 6.

The return information file stores an object name, a naming service registration name, an operation name, a return value name, a return value attribute, a return value (to be automatically generated or edited to match the return value attribute), a parameter name, a parameter attribute, and a parameter value (to be automatically generated or edited to match the parameter attribute).

When a "Simulator" button 952 shown in FIG. 9 is selected, it is possible to shift to the simulator startup processing (the server simulator in this case). When a "Back" button 953 is selected, it is also possible to return to the initial input screen shown in FIG. 7.

As explained above, by the return information preparation processing, it is possible to dynamically obtain on the ORB the IDL information of the target object that has been called by the client application. Therefore, it is not necessary for the application development staff to prepare in advance the IDL information as a test data in the text image as has been necessary in the past. Further, as the obtained IDL information is displayed on the WWW Browser 18 by providing a field for each of the operation, name, attribute and parameter, this facilitates the editing by the application development staff.

Referring to the explanation about the operation of the server simulator in FIG. 4, the "Simulator" button 952 shown in FIG. 9 is selected or the "Server Simulator" 530 shown in FIG. 5 is selected to start the server simulator (at a step S404) after the preparation of the return information at the step S403.

Figure 10:
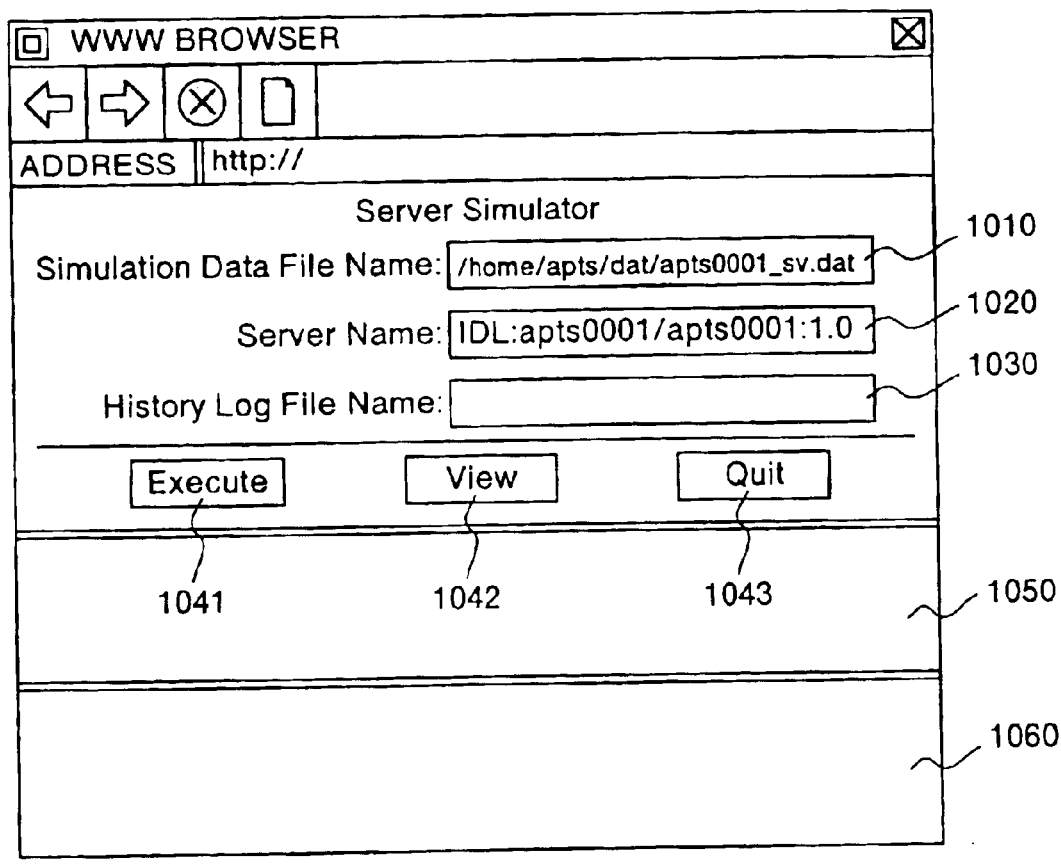
FIG. 10 is an explanatory diagram that shows an initial input screen of a server simulator in the distributed-object development system relating to the present invention.

FIG. 10 is an explanatory diagram that shows an initial input screen of the server simulator. This shows a screen displayed on the WWW Browser 18 based on the startup instruction of the server simulator at the step S404. When the startup instruction of the server simulator is based on the selection of the "Simulator" button 952 shown in FIG. 9, the return information file name is automatically displayed in an information file name input field 1010 as shown in FIG. 10 as the preparation of the return information file has already been completed.

For the same reason, the object name displayed in the object name display field 911 shown in FIG. 9 is displayed as a server name in a server name display field 1020. On the other hand, when the startup instruction of the server simulator is based on the "Server Simulator" 530 shown in FIG. 5, it is necessary to input the return information file name and the server name.

On the initial input screen of the server simulator, it is necessary to input a verification file name in a verification file name input field 1030 (at a step S405). The verification file is a file for collectively storing the startup information and execution log as described later. When the contents of the verification file are checked after ending the execution of the server simulator, it is possible to verify whether the client application has been executed correctly or not.

When an "Execute" button 1041 is selected, the server simulator shifts to a state of waiting for a transmission from the client application (at a step S406). When there has been a transmission from the client application, that is, when a call request for a target object has occurred at the step S406 (corresponding to the step S305 in FIG. 3), the server simulator shifts to a state of receiving a dynamic editing of the return information (at a step S407).

The dynamic editing of the return information is the dynamic execution of the return information preparation processing after the server simulator has been started. In this case, it is possible to dynamically change the contents of the response information according to the request transmitted from the client application.

When there has been no request for a dynamic editing or when the dynamic edit processing has been completed at the step S407, the server simulator takes in the return information shown by the stored return information file (at a step S408). The server simulator then returns the taken-in return information to the client application (at a step S409).

The server simulator stores the contents of the request transmitted from the client application (an object name, a naming service registration name, an operation name, a parameter name, a parameter value, and a break keyword) as startup information (at a step S410). In this case, when there is an error in the type or value of a parameter that does not follow the IDL in the startup information, this effect is described in an execution log to be described later.

This startup information can be reutilized as the startup information for the client simulator. The server simulator stores the execution state of the server simulator (the trace state) as the execution log (a date and a time of the execution, a return information file name, a header, a start keyword, an object name, an operation name, a server interface dynamic implementation state, an end state, and an end keyword) (at a step S411).

Next, the server simulator checks a request for the latest information display from the application development staff (at a step S412). The request for the latest information display means an instruction for carrying out immediately the display of the startup information and the display of the execution log in response to a plurality of requests of the client application that are executed irregularly or continuously. This request is realized by selecting a "View" button 1042 in FIG. 10.

Figure 11:
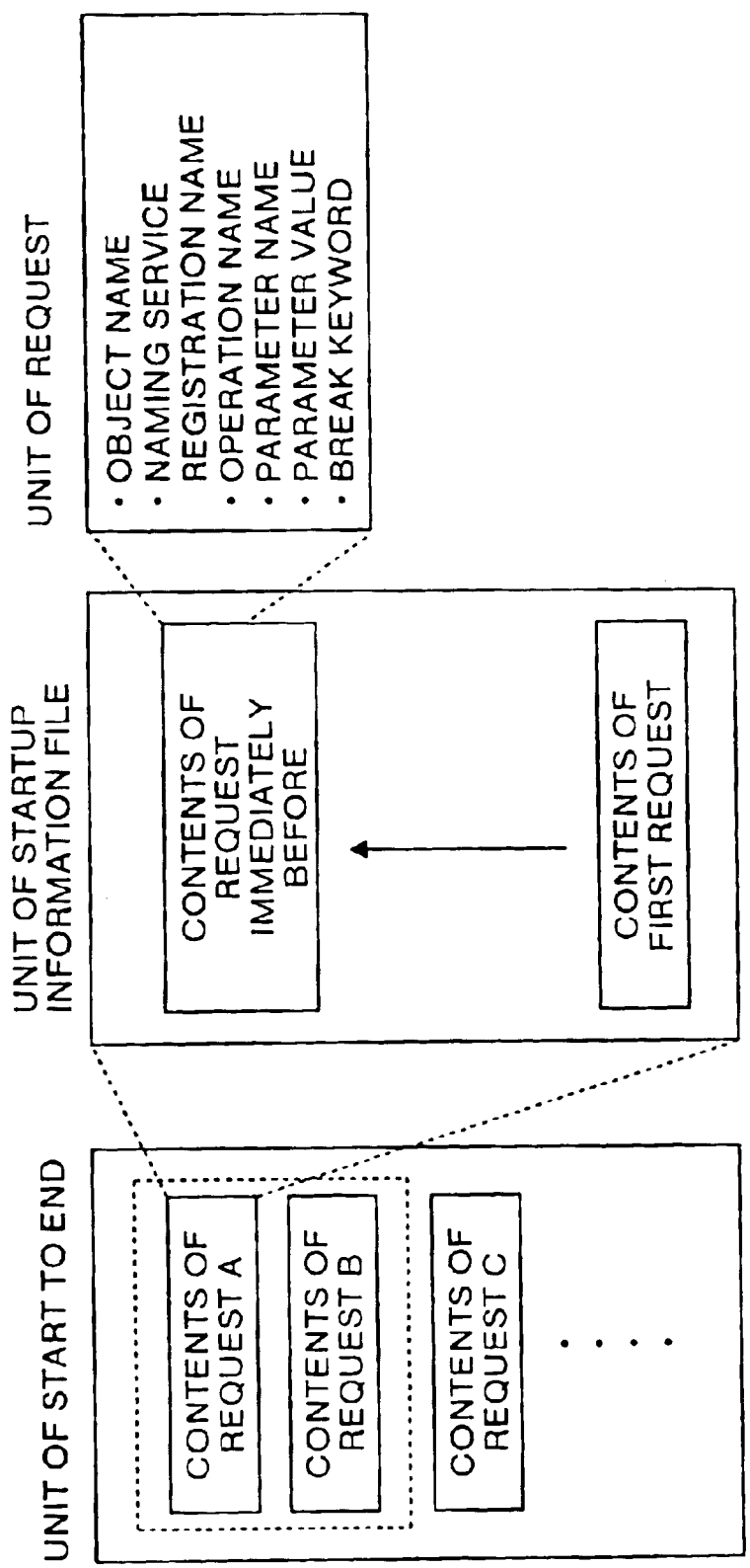
FIG. 11 is a diagram for explaining a display state of startup information in the server simulator in the distributed-object development system relating to the present invention.

When there has been no request for the latest information display at the step S412, the server simulator checks an end request at a step S416 to be described later. When there has been a request for the latest information display at the step S412, the startup information stored at the step S410 is displayed in a startup information display field 1060 shown in FIG. 10 (at a step S413). FIG. 11 is an explanatory diagram for explaining the state of displaying the startup information. As shown in FIG. 11, the contents of each of the plurality of requests from the client application that have been received during a period from the start to the end of the server simulator operation are displayed as the startup information in the startup information display field 1060.

For example, in FIG. 11, the contents of portions encircled by a dotted line, that is, the contents of a request A and a request B, are the portions actually displayed in the startup information display field 1060. The contents of other request C can be displayed by scrolling the startup information display field 1060.

It is possible to include calls for a plurality of target objects in the requests transmitted by the client application. Therefore, it is possible to handle a call for each target object as an independent request. These requests are displayed from bottom upward in the startup information display field 1060 for each target object and for each startup information file.

FIG. 12 is an explanatory diagram that shows a display example of the above startup information. As shown in FIG. 12, the return information display field 1060 shows an object name 1202, a naming service registration name 1203, an operation name 1204, a parameter name and a parameter value 1205, and a break keyword 1207. As shown, it is also possible to display a title 1201 and a return information file name 1207. It is also possible to shift the processing to a return information preparation processing by clicking the return information file name 1207 with a mouse or the like, and to edit the return information file on the edit screen as shown in FIG. 9.

Figure 13:
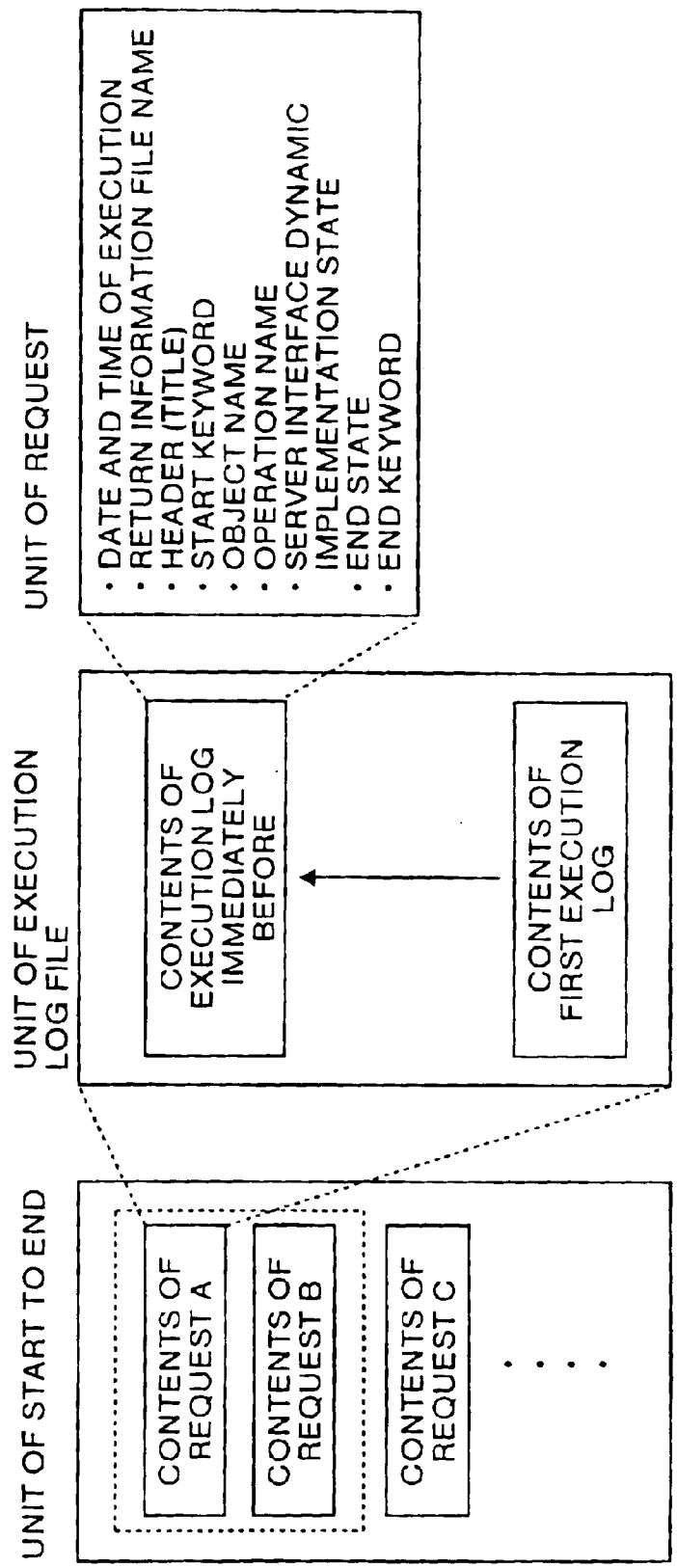
FIG. 13 is a diagram for explaining a display state of an execution log in the server simulator in the distributed-object development system relating to the present invention.

Following the display of the startup information at the step S413, the execution log stored at the step S411 is displayed in the execution log display field 1050 in FIG. 10 (at a step S414). FIG. 13 is an explanatory diagram for explaining a display state of this execution log. As shown in FIG. 13, the contents of the execution log are displayed in an execution log display field 1050 for each of a plurality of requests from the client application that have been received during a period from the start to the end of the server simulator operation by relating the display to the display of the startup information shown in FIG. 11.

For example, in FIG. 13, the contents of portions encircled by a dotted line, that is, the contents of a request A and a request B, are the portions actually displayed in the execution log display field 1050. The contents of other request C can be displayed by scrolling the execution log display field 1050.

As shown in FIG. 13, each request for each target object is displayed for each execution log file from bottom upward in the execution log display field 1050.

FIG. 14 is an explanatory diagram that shows a display example of the above execution log. As shown in FIG. 14, the execution log display field 1050 shows a date and a time of the execution 1401, a return information file name 1402, a header (title) 1403, a start keyword 1404, an object name 1405, an operation name 1406, a server interface dynamic implementation state 1407 and 1408, an end state 1409, and an end keyword 1410.

Figure 15:
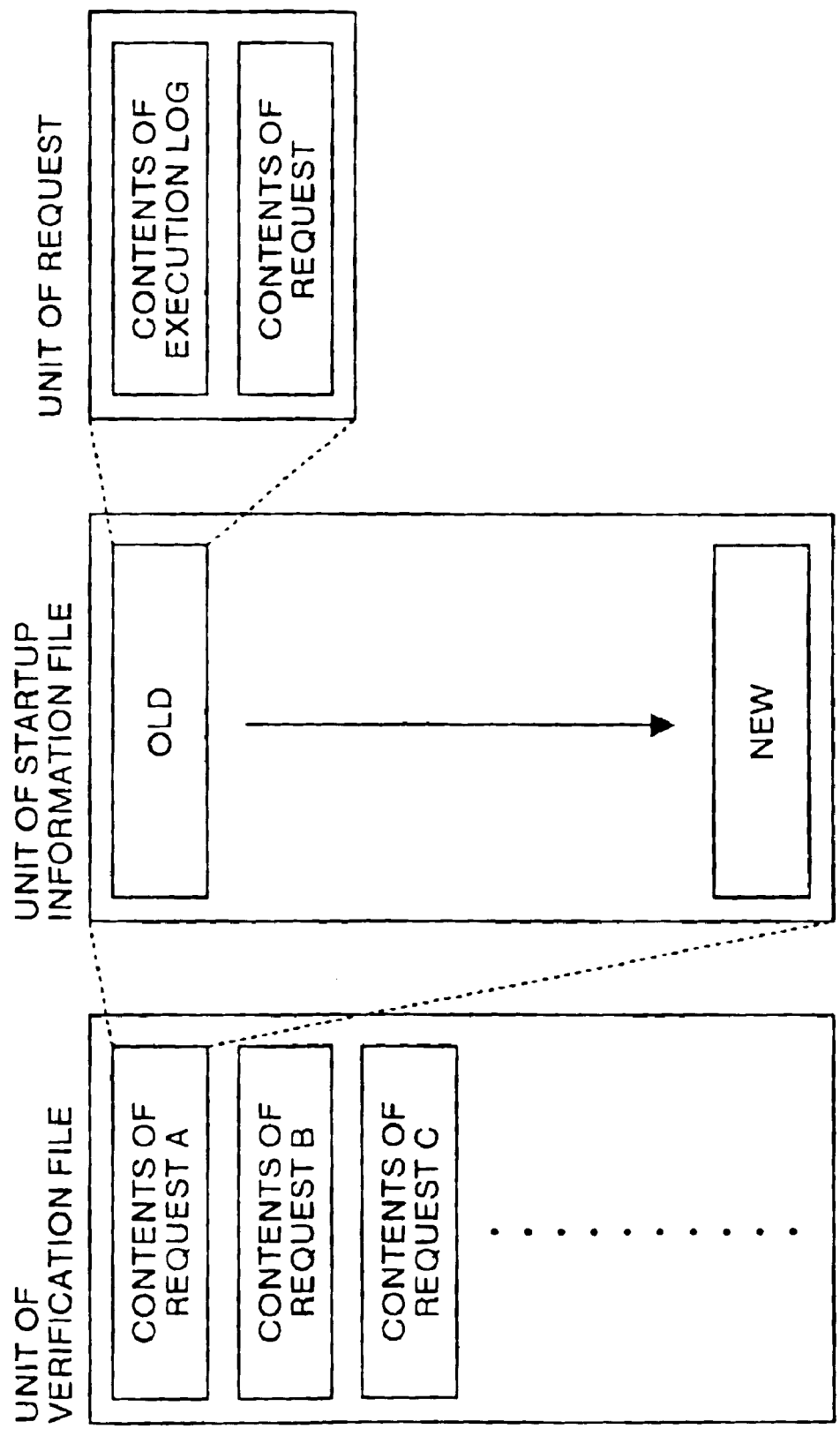
FIG. 15 is a diagram for explaining an internal structure of a verification file in the server simulator in the distributed-object development system relating to the present invention.

Based on the display of the execution log at the step S414, the server simulator generates a verification file (at a step S415). FIG. 15 is an explanatory diagram for explaining an internal structure of the verification file. As shown in FIG. 15, the verification file is organized to include the contents of the execution log prepared at the step S411 and the contents of the startup information (the contents of the request for each target object) prepared at the step S410, for each startup information file and for each request transmitted by the client application, as described above. The above information is stored under the verification file name that has been input at the step S405.

In other words, the verification file is prepared to include the contents of the execution log shown in FIG. 13 and the startup information shown in FIG. 11 that are organized sequentially in a pair, for each of the plurality of requests that have been received from the client application during a period from the start to the end of the server simulator operation.

Then, the server simulator checks a request for ending the execution of the server simulator (at a step S416). This request is carried out by selecting a "Quit" button 1043 shown in FIG. 10. When there has been no end request at the step S416, the server simulator returns again to the return information preparation processing at the step S403, and repeats the above processing.

When there has been an end request at the step S416, the operation of the server simulator stops. In this case, the client application development staff also makes the developed client application end its execution. Finally, the client application development staff refers to the verification file, and verifies an error in the design of the developed client application.

(Process of Developing a Server Application)

Figure 16:
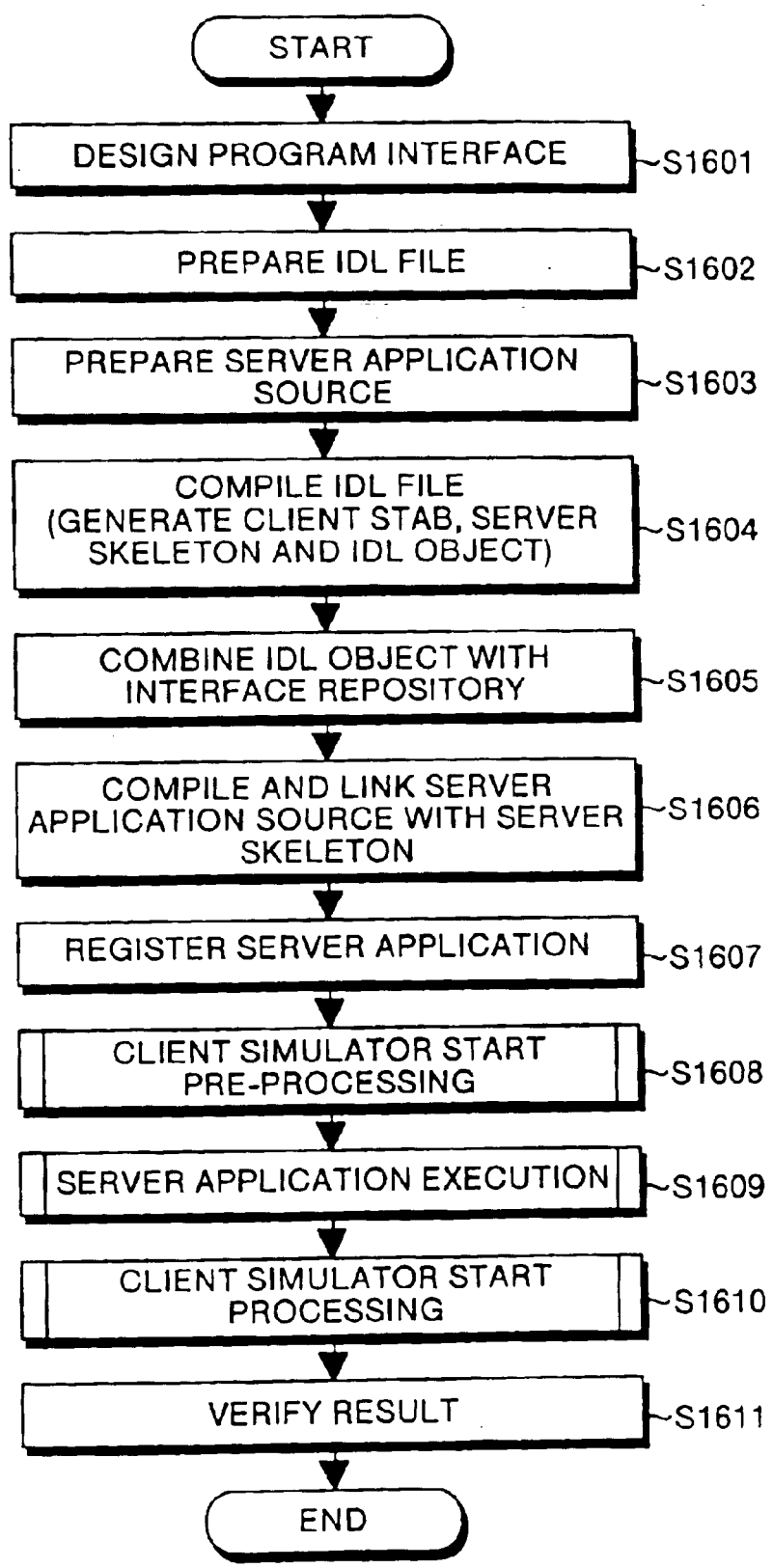
FIG. 16 is a flowchart that shows a process of developing a server application in the distributed-object development system relating to the present invention.
Figure 28:
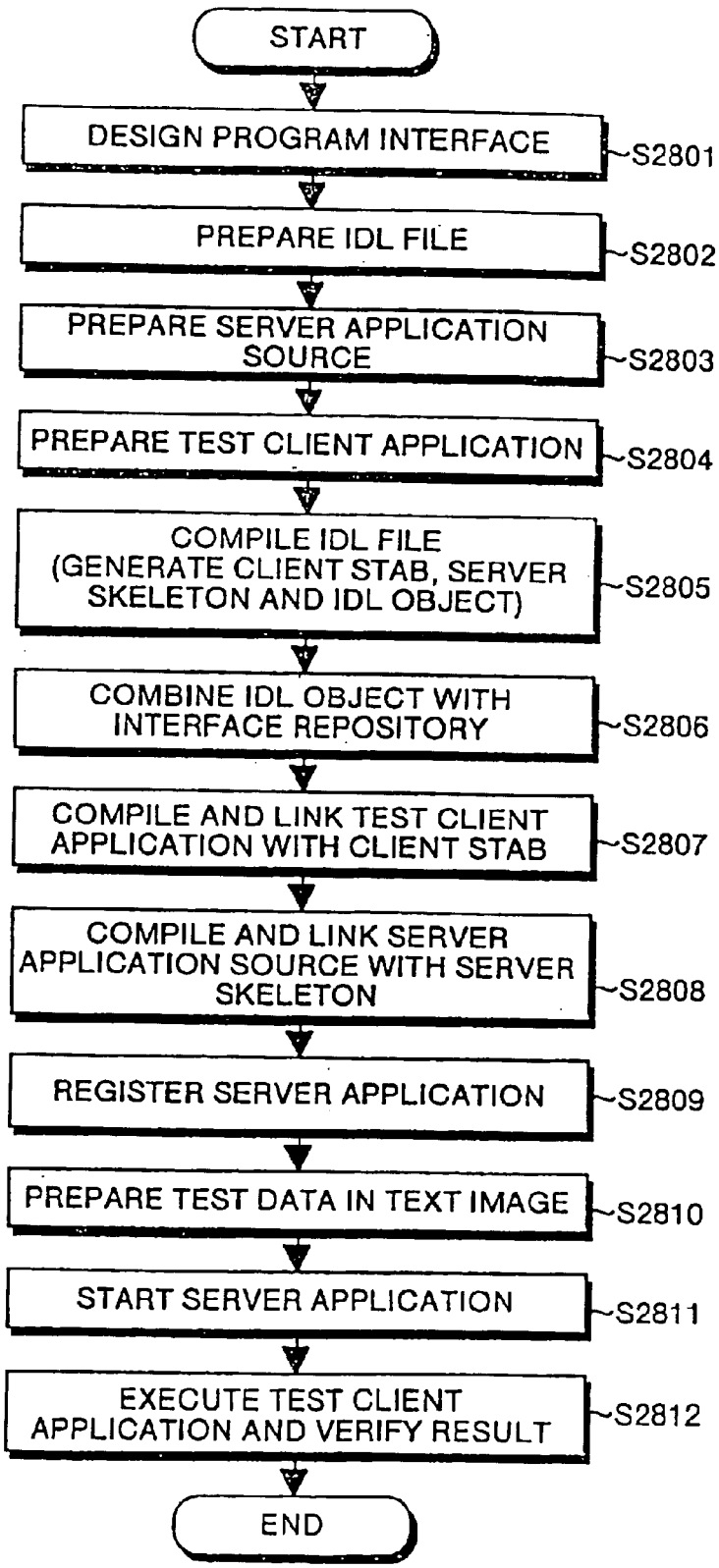
FIG. 28 is a flowchart that shows a conventional process of developing a server application.

Next, the process of developing a server application by using a client simulator in the distributed-object development system relating to the present invention will be explained in relation to the conventional process of developing a server application shown in FIG. 28. FIG. 16 is a flowchart that shows the process of developing a server application by the distributed-object development system relating to the present invention. Like the flowchart in FIG. 2, the flowchart in FIG. 16 shows the process of developing a server application for carrying out the static startup.

Referring to FIG. 16, first, a server application development staff designs a program interface of a server application to be developed (at a step S1601). Then, the server application development staff prepares an IDL file of a function held by the server application (at a step S1602).

Then, the staff prepares a source of a desired server application to be executed by using the IDL file (at a step S1603). Next, the IDL file that has been prepared at the step S1602 is compiled by using an IDL compiler, thereby to generate a client stab, a server skeleton and an IDL object (at a step S1604). The generated IDL object is combined with the interface repository (at a step S1605).

The source of the server application that has been prepared at the step S1603 is compiled to generate an object. This object is linked with the server skeleton generated at the step S1604, thereby to obtain an executable server application file (at a step S1606).

The server simulator obtained at the step S1606 is recorded in the implementation repository, and is also registered as an executable object implementation by the client simulator (at a step S1607).

Then, a pre-processing for starting the client simulator is executed (at a step S1608). The client simulator start pre-processing corresponds to a part of the processing to be realized by the distributed-object development system relating to the present invention. Details of this processing will be explained later.

Then, the server application that has been generated as the executable file at the step S1606 is executed (at a step S1609). The server application to be executed in this case has the same code as that actually mounted under the distributed-objet environment. It is not particularly necessary to add changes for the test. In other words, the server application of a binary source that can be operated on the CORBA without problem is executed.

Figure 17:
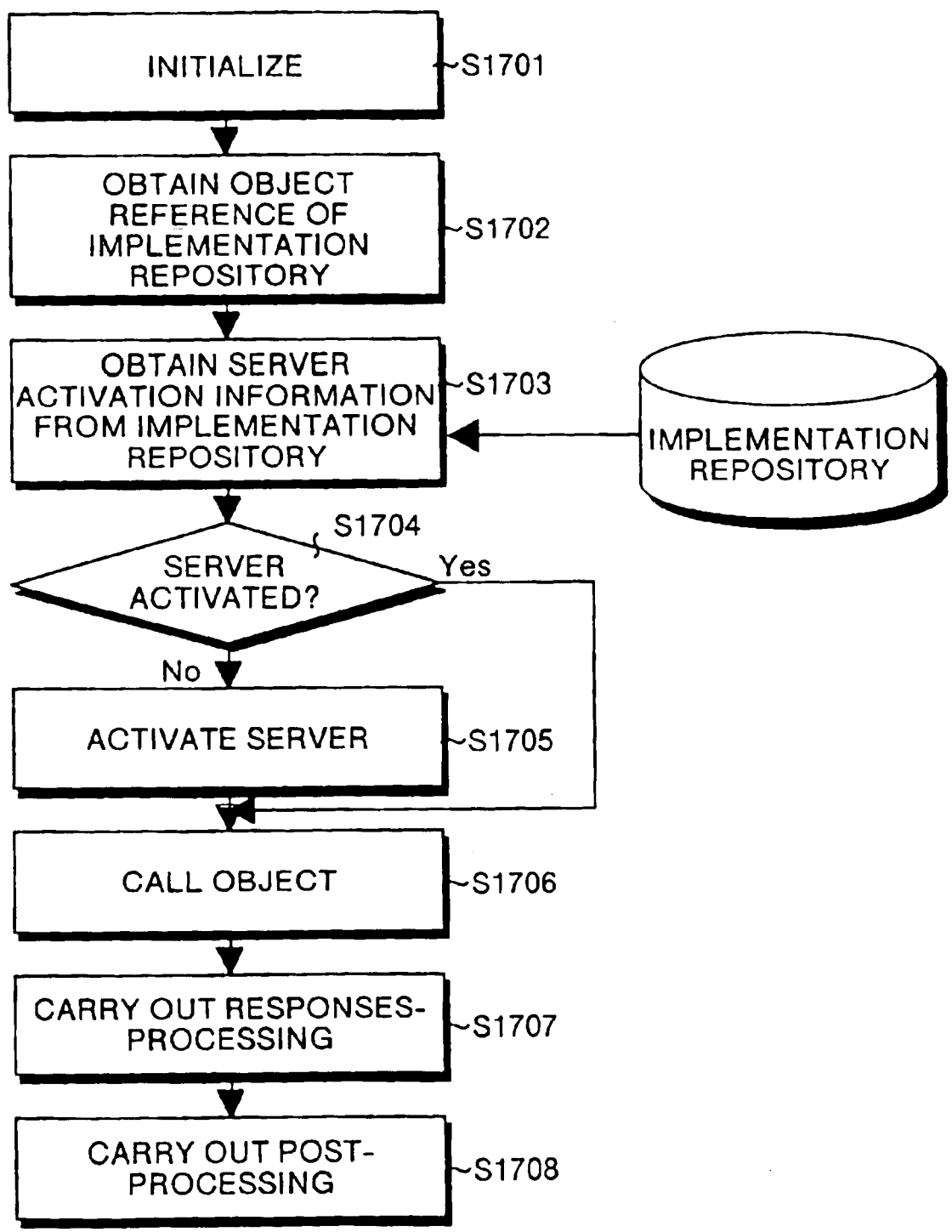
FIG. 17 is a flowchart for explaining a process of executing a server application.

FIG. 17 is a flowchart for explaining the execution processing of this server application. Particularly, FIG. 17 shows a processing to be carried out by the server skeleton and the object adapter for conducting a static startup. Referring to FIG. 17, at first, the server application is initialized, and the object adapter receives a call request for an object from the client application, particularly, from the client stab (at a step S1701).

The received request includes an object reference of the target object. The object adapter needs to obtain an implementation state of the target object from the implementation repository by using the object reference.

However, the implementation repository is also one of the objects on the CORBA. Therefore, it is necessary to obtain in advance the object reference of this implementation repository (at a step S1702). Thus, it becomes possible to access the implementation repository, and it is possible to obtain the activation information of the target object (the server based on a broad definition) (at a step S1703).

Based on the activation information that has been obtained at the step S1703, the object adapter makes a decision as to whether the server has been activated or not (at a step S1704). When the server has not yet been activated at the step S1704, the server is activated (at a step S1705). After the server has been activated, or when the server has already been activated at the step S1704, the server skeleton calls a target object (at a step S1706). At the same time, the server skeleton obtains a return data from the target object, and transmits this return data to the client application that is the transmission source (at a step S1707).

The client stab delivers this return data again to the client application that is the request transmission source, via the ORB core. According to the distributed-object development system relating to the present invention, the return data reception processing and the request transmission processing are carried out by the client simulator. Accordingly, the client simulator simulates the function of the client stab.

After the return processing at the step S1707, the object adapter executes a post-processing of the server such as non-activation, when the server has been activated (at a step S1708).

In FIG. 16, after the server application has been executed, the processing for starting the client application is executed (at a step S1610). This processing for starting the client application also corresponds to a part of the processing realized by the distributed-object development system relating to the present invention. Details of this processing will also be described later.

Then, a result of the operation of the server application is verified based on the request transmitted by the client simulator and the return data returned by the server application in response to this request (at a step S1611).

(Operation of the Client Simulator)

Figure 18:
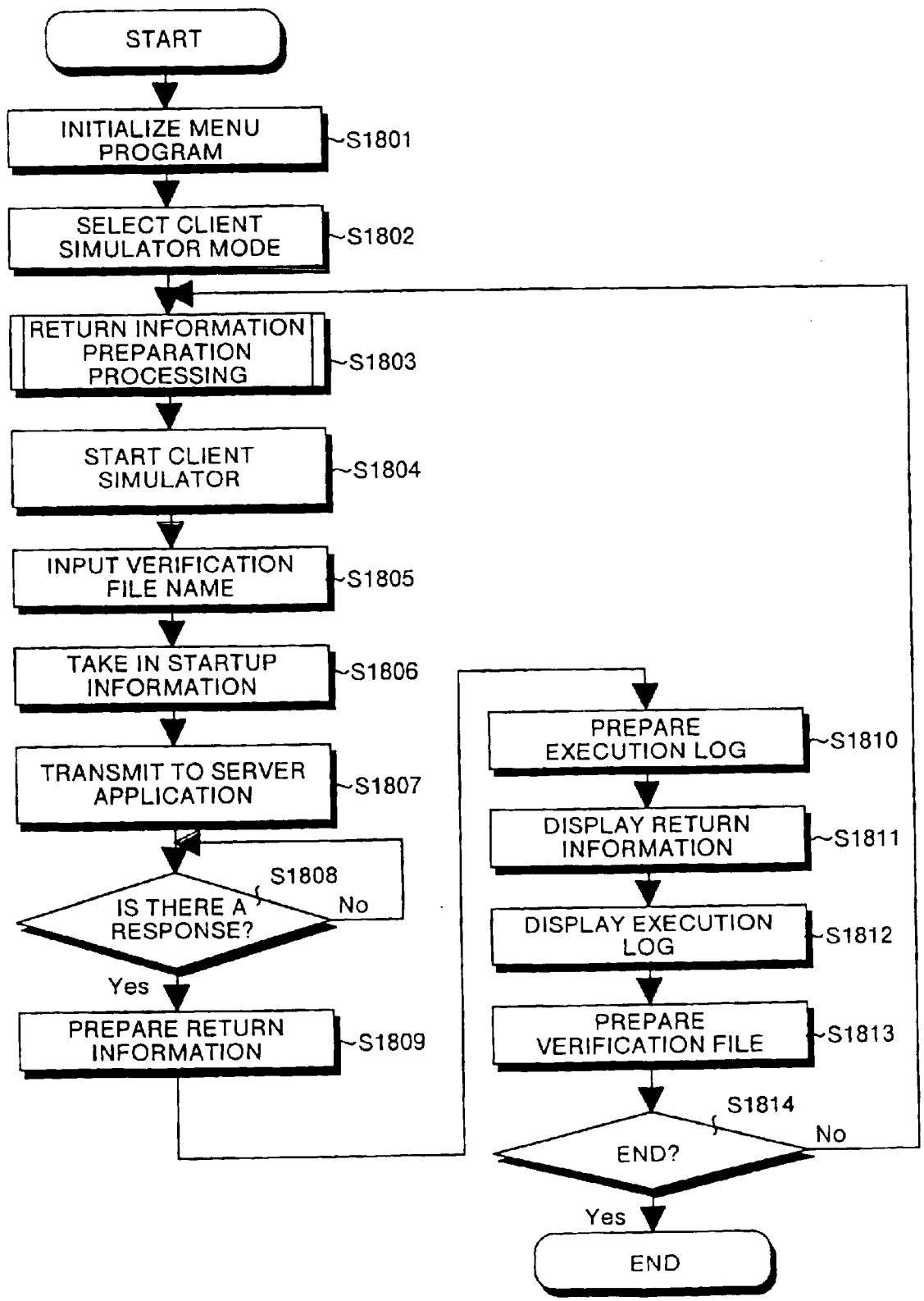
FIG. 18 is a flowchart that shows the operation of a client simulator in the distributed-object development system relating to the present invention.

The operation of the client simulator will be explained next. The operation of the client simulator corresponds to the client simulator start pre-processing and the client simulator start processing. FIG. 18 is a flowchart that shows the operation of a client simulator of the distributed-object development system relating to the present invention. Particularly, the control of the client simulator on the WWW Browser 18 will be explained.

Referring to FIG. 18, the application development staff at first starts the WWW Browser 18 by using one of the nodes under the distributed-object environment 12. Then, the staff starts the menu program shown in FIG. 5 (at a step S1801). In order to prepare the information file for the client simulator, that is, the startup information, the development staff selects the "Simulation Data Editor" 510 on the screen shown in FIG. 5. The processing for preparing the information file is similar to that as explained for the server simulator, and therefore, this explanation will be omitted here.

The client simulator mode is selected by the above-described selector (at a step S1802). Based on this selection, the processing proceeds to the preparation of the startup information (at a step S1803). The startup information is a call name of the information file when the information file is prepared in the client simulator mode. Specifically, this startup information shows a request that is transmitted from the client to the server.

(Startup Information Preparation Processing)

Figure 19:
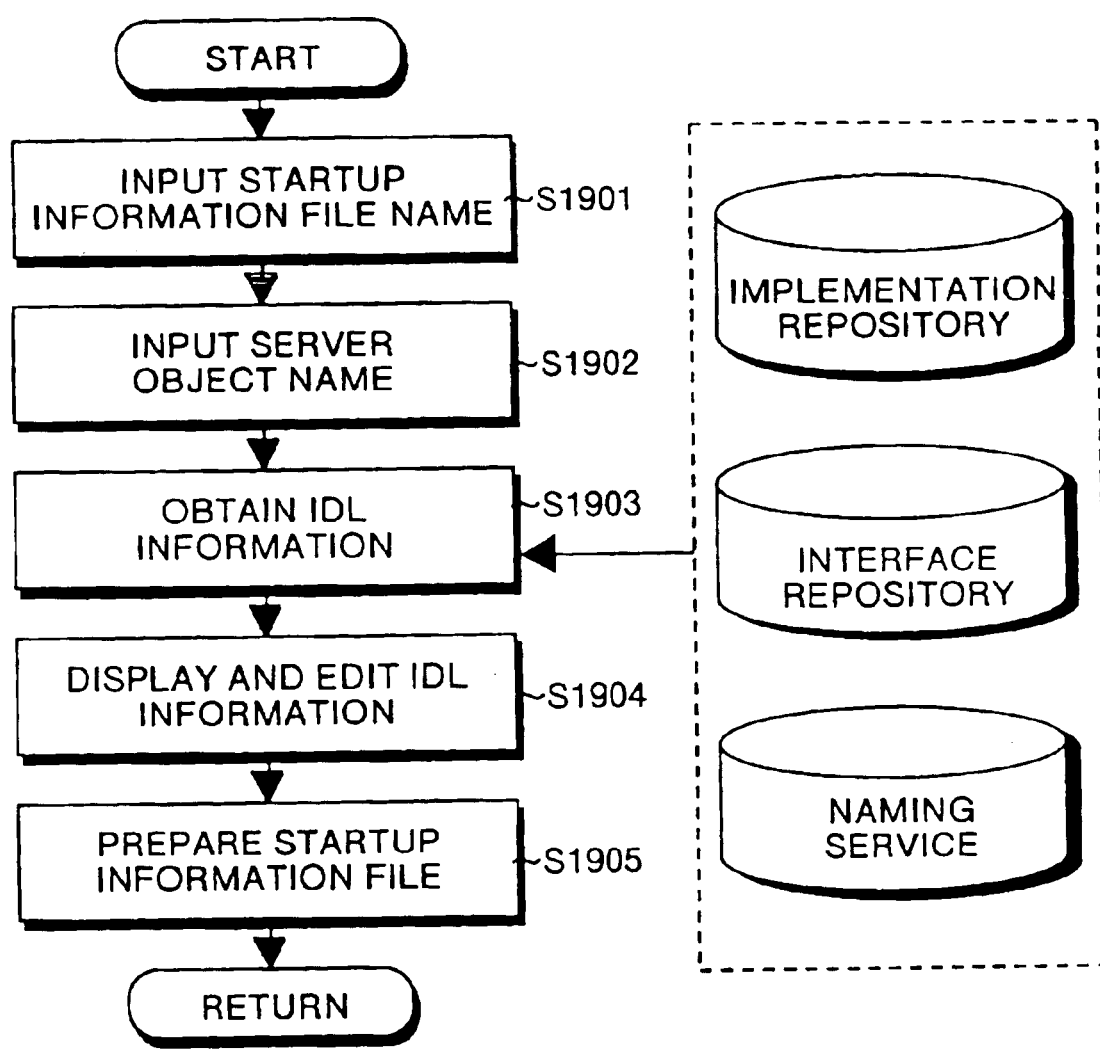
FIG. 19 is a flowchart that shows a process of preparing startup information of the client simulator in the distributed-object development system relating to the present invention.

The startup information preparation processing at the step S1803 will be explained. This processing also corresponds to the client simulator start pre-processing at the step S1608 shown in FIG. 16. FIG. 19 is a flowchart that shows the startup information preparation processing of the client simulator at the step S1803. The initial input screen for this information file (the startup information in this case) preparation processing is similar to that as shown in FIG. 7, and, therefore, this screen will be utilized.

On the screen shown in FIG. 7, a startup information file name is input in the information file name input field 710 (at a step S1901). This startup information file name is a name of a file into which the startup information to be prepared is stored, such as, for example, "/home/apts/dat/apt0001_cl.dat". This startup information file name is referred to at the time of starting the client simulator to be described later.

Next, a server object name is input in the object name input field 720 (at a step S1902). The object name is a name of a target object that is received by the server application and is included in the request transmitted by the client simulator, such as, for example, "IDL:apts0001/apts0001:1.0".

When the "Build" button 701 is selected, the IDL information of the target object is obtained (at a step S1903). The obtained information is displayed, and it becomes possible to edit the data (at a step S1904). When a startup information file already exists, the startup information file name is input in the information file name input field, and the "Edit" button 702 is selected. Then, the startup information file is displayed, and this file can be edited.

The IDL information is obtained at the step S1903 in a similar manner to that at the step S603 shown in FIG. 6. The information file (the startup information in this case) edit screen displayed at the step S1904 is also similar to that at the step S604 shown in FIG. 6. Therefore, detailed explanation of these steps will be omitted here.

Based on the above startup information preparation processing, there is prepared a startup information file that stores an object name, a naming service registration name, an operation name, a return value name, a return value attribute, a parameter name, a parameter attribute, and a parameter value (at a step S1905).

When the "Simulator" button 952 shown in FIG. 9 is selected, it is possible to shift to the simulator startup processing (the client simulator in this case).

As explained above, by the startup information preparation processing, it is possible to dynamically obtain on the ORB the IDL information of the target object that is received by the server application. Therefore, it is not necessary for the application development staff to prepare in advance the IDL information as a test data in the text image as has been necessary in the past. Further, as the obtained IDL information is displayed on the WWW Browser 18 by providing a field for each of the operation, name, attribute and parameter, this facilitates the editing by the application development staff.

Referring to the explanation about the operation of the client simulator shown in FIG. 18, the "Simulator" button 952 shown in FIG. 9 is selected or the "Client Simulator" 520 shown in FIG. 5 is selected to start the client simulator (at a step S1804) after the startup information has been prepared at the step S1803.

Figure 20:
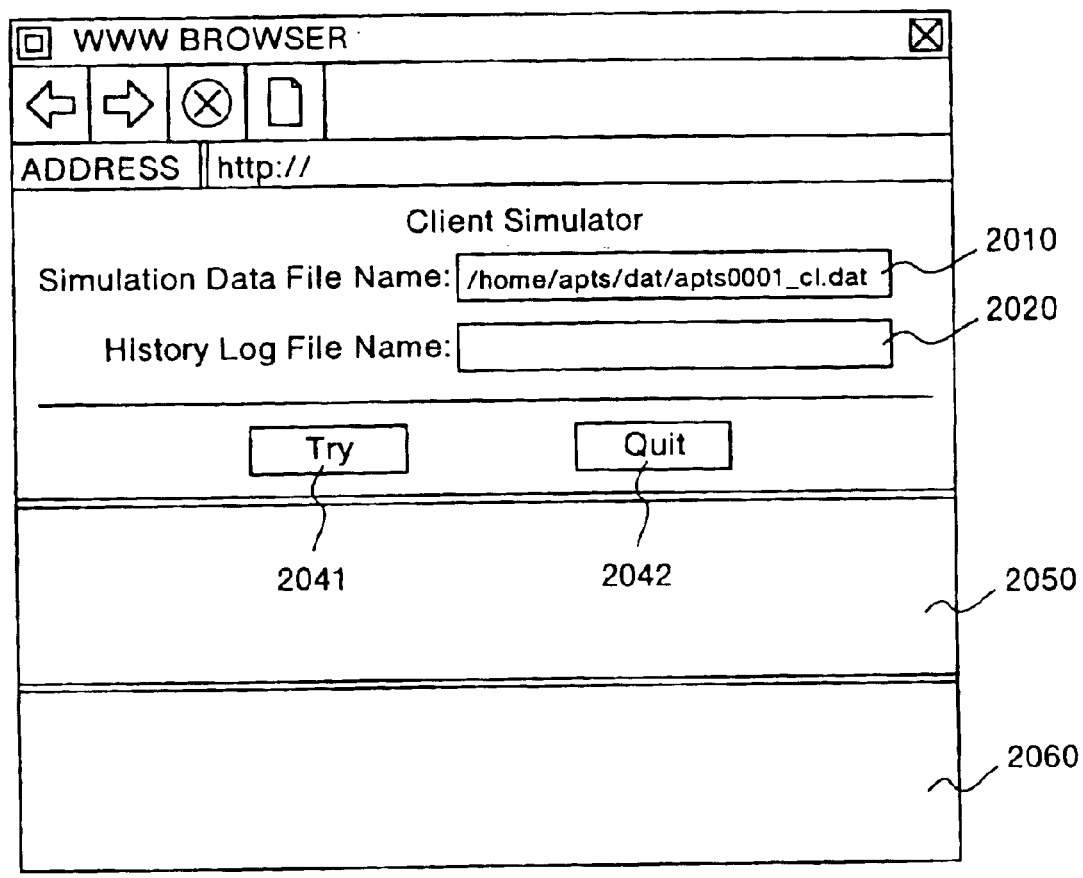
FIG. 20 is an explanatory diagram that shows an initial input screen of the client simulator in the distributed-object development system relating to the present invention.

FIG. 20 is an explanatory diagram that shows an initial input screen of the client simulator. This shows a screen displayed on the WWW Browser 18 based on the startup instruction of the client simulator at the step S1804. When the startup instruction of the client simulator is based on the selection of the "Simulator" button 952 shown in FIG. 9, the startup information file name is automatically displayed in an information file name input field 2010 as shown in FIG. 20 as the preparation of the startup information file has already been completed.

On the other hand, when the startup instruction of the client simulator is based on the "Client Simulator" 520 shown in FIG. 5, it is necessary to input the startup information file name.

On the initial input screen of the client simulator, it is necessary to input a verification file name in a verification file name input field 2020 (at a step S1805). The verification file is a file for collectively storing the startup information and execution log as described above. When the contents of the verification file are checked after ending the execution of the client simulator, it is possible to verify whether the server application has been executed correctly or not.

When a "Try" button 2041 is selected, the client simulator takes in the startup information shown by the saved startup information file (at a step S1806). The client simulator then transmits the taken-in startup information to the server application as a request (at a step S1807).

The client simulator then shifts to a state of waiting for a response from the server application (at a step S1808). When there has been a response from the server application at the step S1808 (corresponding to the step S1707 in FIG. 17), the contents of the response (an object name, a naming service registration name, an operation name, a parameter name, a parameter value, and a break keyword) as return information (at a step S1809). In this case, when there is an error in the type or value of a parameter that does not follow the IDL in the return information, this effect is described in an execution log to be described later.

This return information can be reutilized as the return information for the server simulator. The client simulator stores the execution state of the client simulator (the trace state) as the execution log (a date and a time of the execution, a return information file name, a header, a start keyword, an object name, an operation name, a server interface dynamic implementation state, a request transmission, a reception of the response, an end state, and an end keyword) (at a step S1810).

Figure 21:
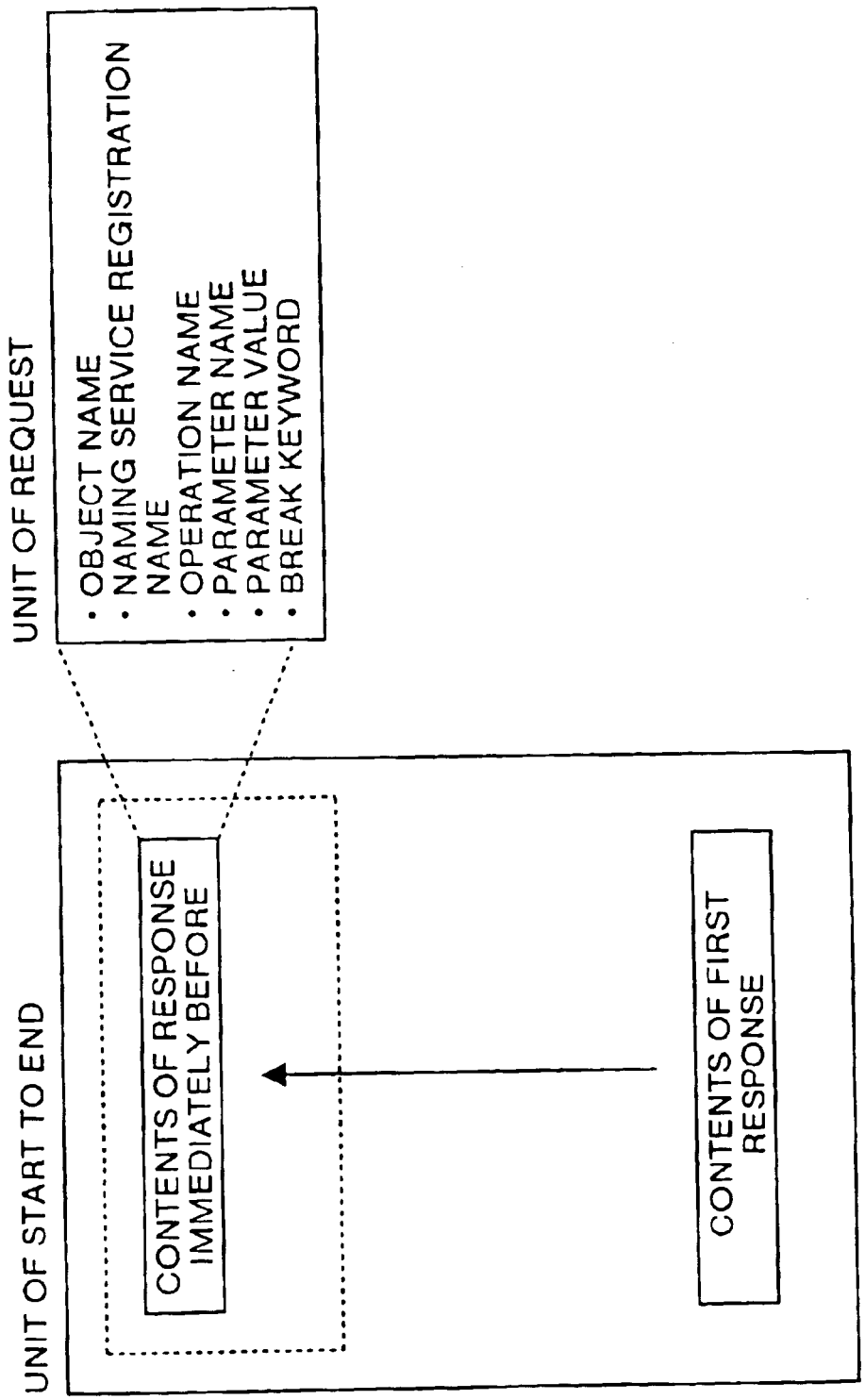
FIG. 21 is a diagram for explaining a display state of return information in the client simulator in the distributed-object development system relating to the present invention.

The return information stored at the step S1809 is displayed in a startup information display field 2060 shown in FIG. 20 (at a step S1811). FIG. 21 is an explanatory diagram for explaining a display state of the return information. As shown in FIG. 21, the contents of the response information are displayed in the return information display field 2060 for each of a plurality of responses received from the server application during a period from the start to the end of the client simulator operation.

For example, in FIG. 21, the contents of portions encircled by a dotted line are the portions actually displayed in the return information display field 2060. Other contents can be displayed by scrolling the return information display field 2060. Each time when a response has been received from the server application, the contents of the response are displayed from bottom upward in the return information display field 2060.

FIG. 22 is an explanatory diagram that shows a display example of the above return information. As shown in FIG. 22, the return information display field 2060 shows an object name 2201, a naming service registration name 2202, an operation name 2203, a parameter name and a parameter value 2204, and a break keyword 2205.

Figure 23:
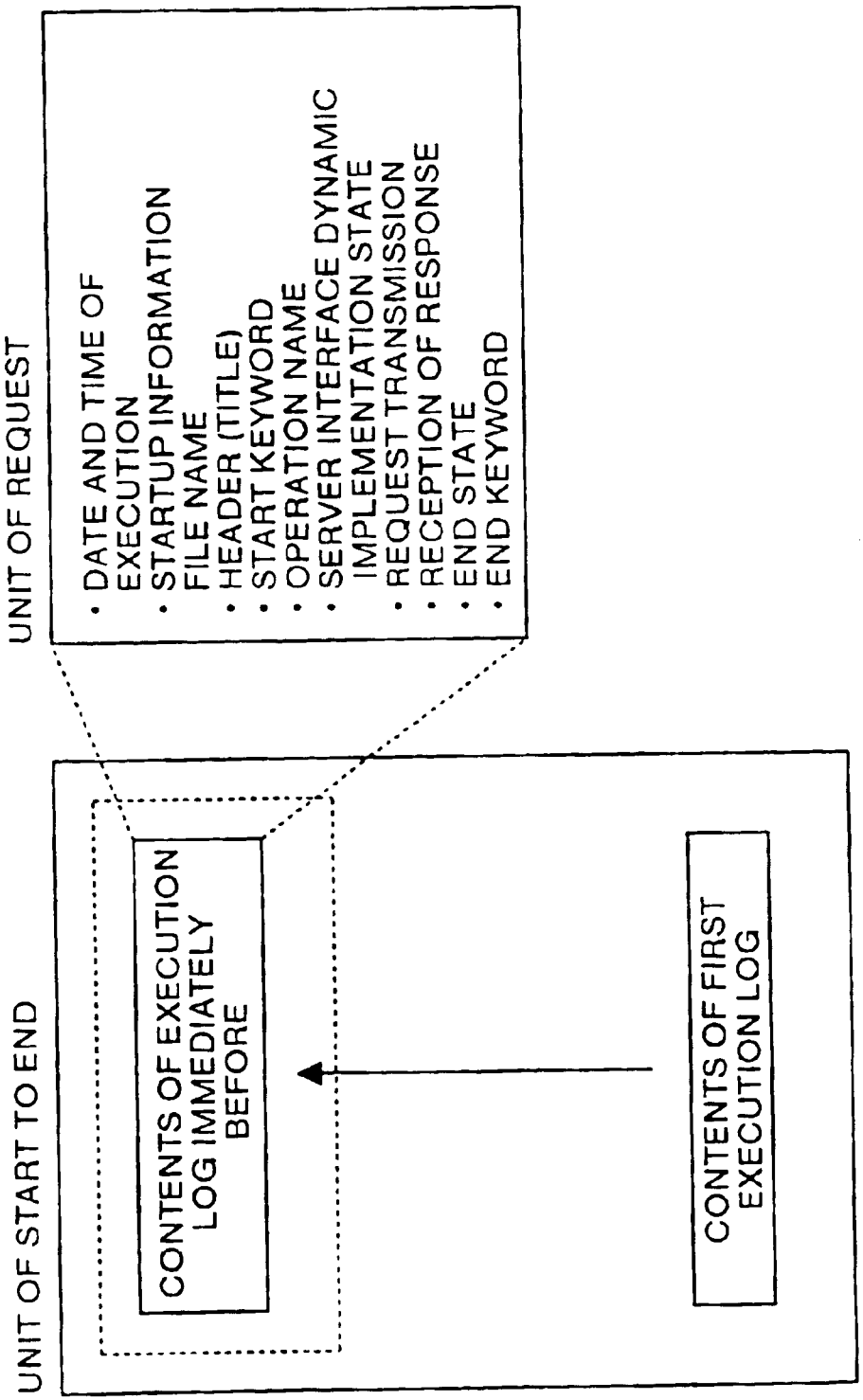
FIG. 23 is a diagram for explaining a display state of an execution log in the client simulator in the distributed-object development system relating to the present invention.

Following the display of the return information at the step S1811, the execution log stored at the step S1810 is displayed in an execution log display field 2050 in FIG. 20 (at a step S1812). FIG. 23 is an explanatory diagram for explaining a display state of this execution log. As shown in FIG. 23, the contents of the execution log are displayed in the execution log display field 2050 for each response from the server application that has been received during a period from the start to the end of the client simulator operation by relating the display to the display of the return information shown in FIG. 21.

For example, in FIG. 23, the contents of portions encircled by a dotted line are the portions actually displayed in the execution log display field 2050. The contents of other responses can be displayed by scrolling the execution log display field 2050. As shown in FIG. 23, the execution log is displayed for each request transmitted from the client simulator from bottom upward in the execution log display field 2050.

FIG. 24 is an explanatory diagram that shows a display example of the above execution log. As shown in FIG. 24, the execution log display field 2050 displays a date and a time of the execution 2301, a startup information file name 2302, a header (title) 2303, a start keyword 2304, an operation name 2305, a server interface dynamic implementation state 2306 and 2307, a request transmission 2308, a reception of the response 2309, an end state 2310, and an end keyword 2311.

Figure 25:
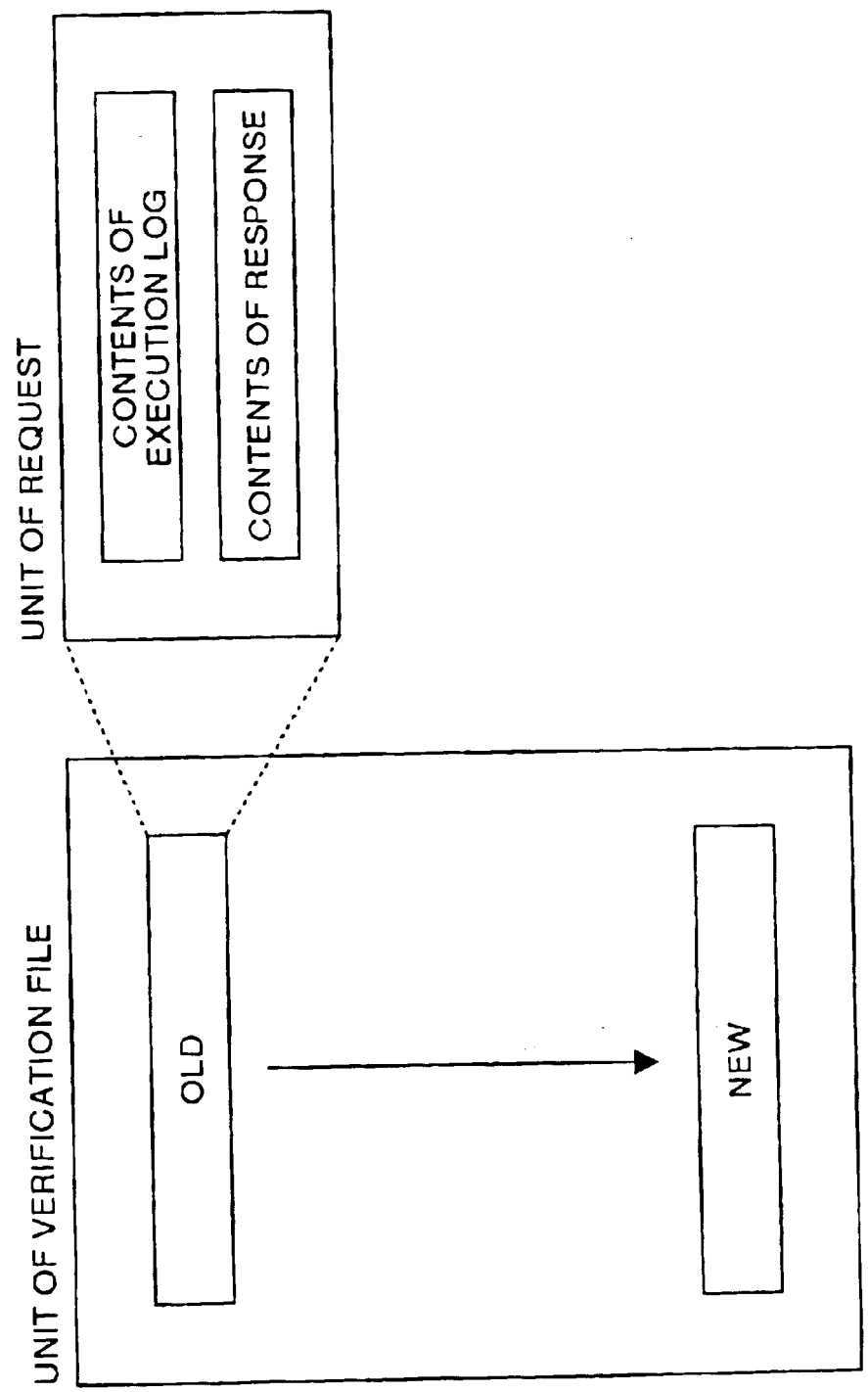
FIG. 25 is a diagram for explaining an internal structure of a verification file in the client simulator in the distributed-object development system relating to the present invention.
Figure 26:
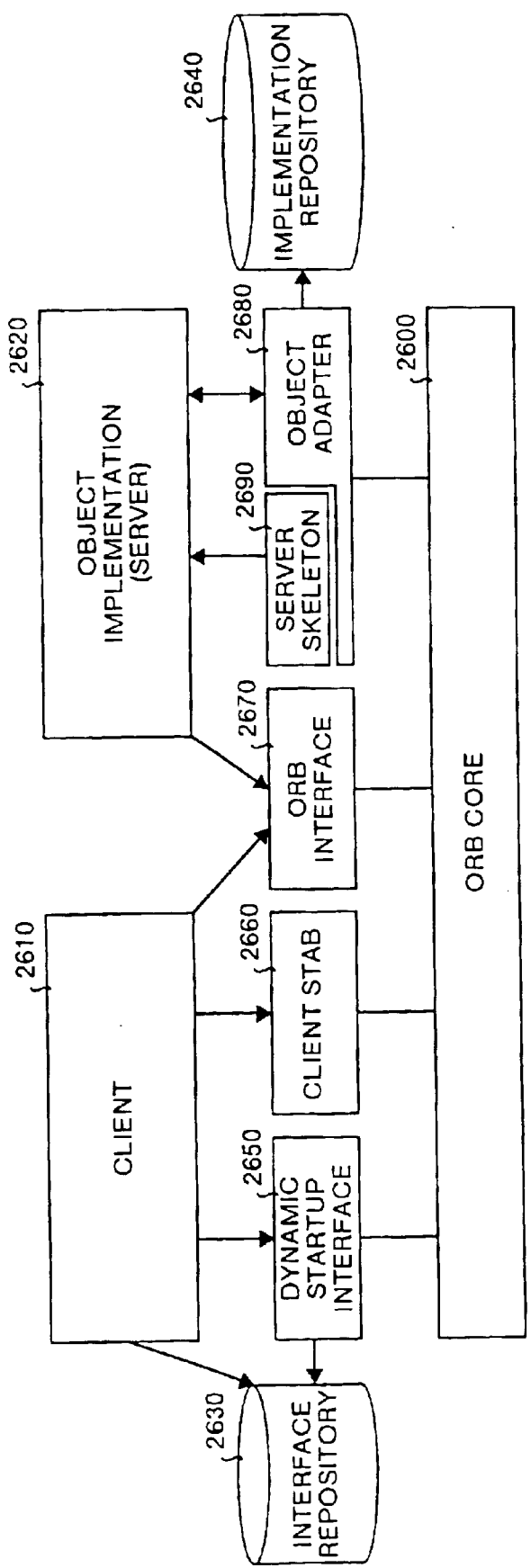
FIG. 26 is a block diagram that shows an interface structure of an ORB in a CORBA.

Following the display of the execution log at the step S1812, the client simulator generates a verification file (at a step S1813). FIG. 25 is an explanatory diagram for explaining an internal structure of the verification file. As shown in FIG. 25, the verification file is organized to include the contents of the execution log prepared at the step S1810 and the contents of the response information (the contents of the response from the server application) prepared at the step S1809, and is stored under the verification file name that has been input at the step S1805.

In other words, the verification file is prepared to include the contents of the execution log shown in FIG. 23 and the startup information shown in FIG. 21 that are organized sequentially in a pair, for each response that has been received from the server application during a period from the start to the end of the server simulator operation.

Then, the client simulator checks a request for ending the execution of the client application (at a step S1814). This request is carried out by selecting a "Quit" button 2042 shown in FIG. 20. When there has been no end request at the step S1814, the client simulator returns again to the startup information preparation processing at the step S1803, and repeats the above processing.

When there has been an end request at the step S1814, the operation of the client simulator stops. In this case, the server application development staff also makes the developed server application end its execution. Finally, the server application development staff refers to the verification file, and verifies an error in the design of the developed server application.

As explained above, according to the distributed-object development system and the distributed-object development method relating to the present embodiment, it is possible to automatically prepare a test data (an information file) by obtaining and utilizing the IDL information when a test server application is necessary to verify the execution of a client application or when a test client application is necessary to verify the execution of a server application. Therefore, it is not necessary to manually prepare the test data. As a result, it is possible to reduce the load of the application development staff.

Further, by calling an object and/or executing the object by using the test data prepared, it is possible to simulate the server application or the client application. Therefore, it is not necessary to develop a test application. As a result, it is possible to decrease the time required for developing the application.

By automatically building up a server simulator or a client simulator on the WWW server 20, it is possible to separate the environment for developing a client application and a server application. It is also possible to control the operation of the client application or the server application via the WWW Browser 18. As a result, it is possible to build up an environment for developing applications on a desired host system.

In the above-explained embodiment, when the simulation program for executing the processing shown in FIG. 14 and FIG. 18 is stored on a recording medium such as an IC card memory, a floppy disk, an optical magnetic disk, a CD-ROM, etc., and also when the program stored on the recording medium is installed on a node (including the simulation machine 10 and the WWW server 20) on the distributed-object environment 12, it is possible to use the distributed-object development method and to build up the distributed-object development system. The program can also be installed by downloading the program from one node to the other node by using a communication line.

As explained above, according to the distributed-object development system and the computer-readable recording medium recorded with a program for making a computer execute the distributed-object development relating to the present invention, under the distributed-object environment, the distributed-object development system defines information on the type of the object, obtains interface definition information for intermediating between the client application and the server application, and simulates the calling of the object and/or the execution of the object based on the obtained information. Therefore, it becomes possible to automatically generate a test data that is necessary for executing a test application that forms a pair with the application of which execution is to be verified, without the need for generating the test data as has been required in the past. Further, this test data is used as a communication message for calling the object and/or executing the object. Therefore, it is possible to automatically build up a server simulator or a client simulator. As a result, there is an effect that it is possible to decrease the time required for developing the application.

Further, according to the distributed-object development system and the computer-readable recording medium recorded with a program for making a computer execute the distributed-object development relating to the present invention, the distributed-object development system defines information on the type of the object, obtains interface definition information for intermediating between the client application and the server application, generates a response in reply to a call request for the object issued by the client application based on the obtained information, and transmits the generated response to the client application. Further, the distributed-object development system obtains the interface definition information, generates the call request for the object based on the obtained information, transmits the generated request to the server application, and receives a response transmitted from the server application in reply to the request. Therefore, it is possible to automatically build up a function for simulating the server application and the client application. As a result, there is an effect that it is possible to decrease the load on the application development staff and to decrease the time required for developing the application.

Further, according to the distributed-object development system relating to the present invention, at least one of the plurality of nodes is equipped with the server application simulator and/or the client application simulator, and a desired node out of the rest of the nodes other than the above node controls the simulation function of the server application simulator and/or the client application simulator via the network. Therefore, there is an effect that it is possible to dispose the application to be tested and the application to be simulated separately on the network.

Further, according to the distributed-object development system relating to the present invention, a simulation function for the server application simulator and/or the client application simulator is provided on a WWW server that is one of the nodes, and one other node out of the rest of the nodes controls the simulation function via a WWW Browser. Therefore, the application development staff can enjoy an easy operation based on the GUI display on the WWW Browser. As a result, there is an effect that it is possible to increase the efficiency of developing the application, and it is also possible to build up an environment for developing applications on a desired host system via the WWW Browser.

Further, according to the distributed-object development system relating to the present invention, the server application simulator prepares a verification file that consists of the contents of the call request for the object issued by the client application and the contents of the generated response. Therefore, there is an effect that it is possible to verify an error in the design of a developed client application by referring to the verification file.

Further, according to the distributed-object development system relating to the present invention, when the contents of the call request for the object issued by the client application do not coincide with a type according to the definition of the interface, the server application simulator prepares the verification file by adding the information showing non-coincidence of type to the contents of the generated response. Therefore, there is an effect that it is possible to find easily an error in the design of a developed client application by referring to the verification file.

Further, according to the distributed-object development system relating to the present invention, the client application simulator prepares a verification file that consists of the contents of the generated response and the contents of the response transmitted from the server application in reply to a call request. Therefore, there is an effect that it is possible to verify an error in the design of a developed server application by referring to the verification file.

Further, according to the distributed-object development system relating to the present invention, when the contents of the response returned from the server application do not coincide with the type according to the definition of the interface, the client application simulator generates the verification file by adding the information showing non-coincidence of type to the contents of the generated request. Therefore, there is an effect that it is possible to find easily an error in the design of a developed server application by referring to the verification file.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed-object development system for developing a client application to be executed by a client that is one of a plurality of nodes for calling an object or a server application to be executed by a server that is one of the plurality of nodes for providing services by the object under a distributed-object environment where the objects are distributed to the plurality of nodes on a network, the distributed-object development system comprising:

a server application simulator that defines information on the type of the object, obtains interface definition information for intermediating between the client application and the server application, simulates a response in reply to a call request for the object issued by the client application by the simulator generating the response based on the obtained information instead of obtaining the response from a procedure that actually implements the object, and transmits the generated response to the client application, where the call request passes from the client application to the server application simulator through an object request broker; and a client application simulator that obtains the interface definition information, simulates an other call request for the object by the simulator generating the other request based on the obtained information, transmits the generated request to the server application, and receives a response transmitted from the server application in reply to the request.

2. The distributed-object development system according to claim 1, wherein at least one of the plurality of nodes is equipped with the server application simulator or the client application simulator, and a desired node out of the rest of the nodes other than the above node controls the simulation function of at least one of the server application simulator and the client application simulator via the network.

3. The distributed-object development system according to claim 2, wherein a simulation function for the server application simulator and the client application simulator is provided on a WWW (Worldwide Web) server that is one of the nodes, and one other node out of the rest of the nodes controls the simulation function via a WWW Browser.

4. The distributed-object development system according to claim 1, wherein, when the contents of the call request for the object issued by the client application do not coincide with a type according to the definition of the interface, the server application simulator prepares a verification file by adding the information showing non-coincidence of type to the contents of the generated response.

5. The distributed-object development system according to claim 1, wherein, when the contents of the response returned from the server application do not coincide with the type according to the definition of the interface, the client application simulator generates a verification file by adding the information showing non-coincidence of type to the contents of the generated request.

6. A computer-readable recording medium recorded with a program for developing a client application to be executed by a client that is one of a plurality of nodes for calling an object or a server application to be executed by a server that is one of the plurality of nodes for providing services by the object under a distributed-object environment where the objects are distributed to the plurality of nodes on a network, wherein the recording medium is recorded with a program that executes:

selecting the simulation of either the server application or the client application;

obtaining interface definition information that defines information on the type of the object and intermediates between the client application and the server application;

simulating a response according to a call request for the object from the client application by the simulator generating the response based on the obtained interface information instead of obtaining the response from a procedure that actually implements the object, when the simulation of the server application has been selected;

transmitting to the client application the response generated, where the call request passes from the client application to the server application simulator through an object request broker;

simulating an other call request for the object, by the simulator generating the other request based on the obtained interface information, when the simulation of the client application has been selected;

transmitting to the server application a request generated and receiving a response transmitted from the server application according to the request, where the call request passes from the client application to the server application simulator through an object request broker.

7. A distributed-object development system for developing a client application to be executed by a client that is one of a plurality of nodes for calling an object or a server application to be executed by a server that is one of the plurality of nodes for providing services by the object under a distributed-object environment where the objects are distributed to the plurality of nodes on a network, the distributed-object development system comprising:

a server application simulator that defines information on the type of the object, obtains interface definition information for intermediating between the client application and the server application, simulates a response in reply to a call request for the object issued by the client application by the simulator generating the response based on the obtained information instead of obtaining the response from a procedure that actually implements the object, and transmits the generated response to the client application, where the call request passes from the client application to the server application simulator through an object request broker.

8. A distributed-object development system according to claim 7, further comprising:

a client application simulator that obtains the interface definition information, simulates another call request for the object by generating the other request based on the obtained information, transmitting the generated request to the server application through the object request broker, and receives a response transmitted from the server application in reply to the request.

9. A distributed-object development system according to claim 7, wherein the server application simulator is interactively controllable through a graphical user interface which allows interactive configuration of a log relating to the server application simulator's simulation of the response, interactive control of execution of the server application simulator, or interactive configuration of test values to be included in the simulated response.

10. A distributed-object development system according to claim 9, wherein the interactive configuration of test values to be included in the simulated response is based on the interface definition information.

11. A distributed-object development system according to claim 9, wherein the graphical user interface provides an interface for interactively accessing the log relating to the server application simulator's simulation of the response.

* * * * *